(12) United States Patent
Sakaguchi et al.

(10) Patent No.: US 10,519,935 B2
(45) Date of Patent: *Dec. 31, 2019

(54) CONDITION MONITORING SYSTEM AND WIND POWER GENERATION SYSTEM USING THE SAME

(71) Applicant: NTN Corporation, Osaka (JP)

(72) Inventors: Tomoya Sakaguchi, Kuwana (JP); Kouma Katou, Kuwana (JP)

(73) Assignee: NTN CORPORATION, Osaka (JP)

( * ) Notice: Subject to any disclaimer, the term of this patent is extended or adjusted under 35 U.S.C. 154(b) by 279 days.

This patent is subject to a terminal disclaimer.

(21) Appl. No.: 15/321,113

(22) PCT Filed: May 29, 2015

(86) PCT No.: PCT/JP2015/065592
§ 371 (c)(1),
(2) Date: Dec. 21, 2016

(87) PCT Pub. No.: WO2015/198793
PCT Pub. Date: Dec. 30, 2015

(65) Prior Publication Data
US 2017/0130700 A1  May 11, 2017

(30) Foreign Application Priority Data

Jun. 24, 2014 (JP) ................................. 2014-129052
Jun. 24, 2014 (JP) ................................. 2014-129057

(51) Int. Cl.
*F03D 17/00* (2016.01)
*F03D 9/25* (2016.01)

(52) U.S. Cl.
CPC .............. *F03D 17/00* (2016.05); *F03D 9/25* (2016.05); *F05B 2220/706* (2013.01); *F05B 2240/912* (2013.01); *F05B 2260/80* (2013.01)

(58) Field of Classification Search
CPC ........................................................ F03D 17/00
See application file for complete search history.

(56) References Cited

U.S. PATENT DOCUMENTS 6,525,518 B1  2/2003 Garnaes
7,860,663 B2  12/2010 Miyasaka et al.
(Continued)

FOREIGN PATENT DOCUMENTS

CN   102156043 A   8/2011
CN   102713554 A   10/2012
(Continued)

OTHER PUBLICATIONS

International Search Report issued in International Application No. PCT/JP2015/065592 dated Sep. 1, 2015, with English Translation.
(Continued)

*Primary Examiner* — Hyun D Park
(74) *Attorney, Agent, or Firm* — McDermott Will & Emery LLP

(57) ABSTRACT

A condition monitoring system for a wind turbine includes: each sensor to sense a condition of equipment; a monitor device configured to generate a diagnosis parameter based on a detection result of each sensor; a data server configured to diagnose a failure of the equipment based on the diagnosis parameter; and a rotation angle sensor for sensing the nacelle's rotation speed. The data server is configured to correct the diagnosis parameter based on a sensed result of the rotation angle sensor, and diagnose whether the equipment has a failure by comparing the corrected diagnosis parameter with a predetermined threshold value.

8 Claims, 13 Drawing Sheets

(56) References Cited

U.S. PATENT DOCUMENTS

| | | | |
|---|---|---|---|
| 8,249,852 | B2 | 8/2012 | Thulke |
| 9,057,360 | B2 | 6/2015 | Tobinaga |
| 9,423,290 | B2 | 8/2016 | Sakaguchi et al. |
| 9,458,835 | B2 | 10/2016 | Ikeda et al. |
| 9,816,483 | B2 | 11/2017 | Nakamura et al. |
| 9,869,298 | B2 | 1/2018 | Rosenvard et al. |
| 2005/0276696 | A1 | 12/2005 | LeMieux |
| 2008/0079263 | A1* | 4/2008 | Morjaria ............... F03D 7/0284 290/44 |
| 2008/0234964 | A1 | 9/2008 | Miyasaka et al. |
| 2009/0183576 | A1* | 7/2009 | Honhoff ................ F03D 7/02 73/861.85 |
| 2011/0125419 | A1* | 5/2011 | Bechhoefer ........... F03D 7/047 702/34 |
| 2011/0162865 | A1 | 7/2011 | Ueno et al. |
| 2011/0175365 | A1* | 7/2011 | Hines .................... F03D 80/00 290/55 |
| 2012/0027585 | A1 | 2/2012 | Daniels et al. |
| 2012/0139257 | A1 | 6/2012 | Tobinaga |
| 2013/0006540 | A1 | 1/2013 | Sakaguchi et al. |
| 2013/0099494 | A1* | 4/2013 | Numajiri .............. F03D 7/0212 290/44 |
| 2013/0104930 | A1 | 5/2013 | Shih et al. |
| 2013/0115043 | A1 | 5/2013 | Rosenvard et al. |
| 2013/0214534 | A1 | 8/2013 | Nakamura et al. |
| 2013/0261988 | A1 | 10/2013 | Lim et al. |
| 2014/0007657 | A1 | 1/2014 | Matsubara et al. |
| 2014/0054894 | A1 | 2/2014 | Olesen |
| 2015/0116131 | A1 | 4/2015 | Ikeda et al. |
| 2015/0204208 | A1 | 7/2015 | Bertolotti et al. |
| 2017/0241409 | A1 | 8/2017 | Kjaer |

FOREIGN PATENT DOCUMENTS

| | | | |
|---|---|---|---|
| CN | 103140672 | A | 6/2013 |
| CN | 104792294 | A | 7/2015 |
| EP | 1045988 | A1 | 10/2000 |
| EP | 2522977 | A1 | 11/2012 |
| EP | 2687857 | A1 | 1/2014 |
| EP | 2728175 | A1 | 5/2014 |
| JP | 7-218333 | A | 8/1995 |
| JP | H07-218333 | A | 8/1995 |
| JP | 10-288546 | A | 10/1998 |
| JP | 2000-146771 | A | 5/2000 |
| JP | 2002-509222 | A | 3/2002 |
| JP | 2006-105956 | A | 4/2006 |
| JP | 2006-234786 | A | 9/2006 |
| JP | 2006-275954 | A | 10/2006 |
| JP | 2008-309097 | A | 12/2008 |
| JP | 2009-216486 | A | 9/2009 |
| JP | 2011-154020 | A | 8/2011 |
| JP | 2012-092757 | | 5/2012 |
| JP | 2012-122342 | A | 6/2012 |
| JP | 2012-181169 | A | 9/2012 |
| JP | 2013-170507 | A | 9/2013 |
| JP | 2013-185507 | A | 9/2013 |
| JP | 2014-010016 | A | 1/2014 |
| WO | 2011/058099 | A1 | 5/2011 |
| WO | 2011/121781 | A1 | 10/2011 |
| WO | 2012/000506 | A2 | 1/2012 |
| WO | 2013/065323 | A1 | 5/2013 |
| WO | 2013/104930 | A1 | 7/2013 |

OTHER PUBLICATIONS

Extended European Search Report issued in EP Patent Application No. 15812286.1, dated Feb. 23, 2018.

Chinese Office Action issued in corresponding Chinese Patent Application No. 201580034268.X, dated Sep. 7, 2018, with English Translation.

Office Action issued in corresponding Japanese Patent Application No. 2014-129052, dated Mar. 6, 2018.

Office Action issued in corresponding Japanese Patent Application No. 2014-129057, dated Mar. 27, 2018.

Search Report issued in corresponding International Patent Application No. PCT/JP2015/069749, dated Oct. 6, 2015, with English translation.

Extended Search Report issued in corresponding European Patent Application No. 15826326.9 dated Feb. 13, 2018.

Decision to Grant Patent issued in corresponding Japanese Patent Application No. 2014-153748 dated Mar. 13, 2018, with English translation.

Office Action issued in corresponding Japanese Patent Application No. 2014-153764, dated Jun. 5, 2018.

Office Action issued in corresponding Chinese Patent Application No. 201580041568.0, dated Jul. 16, 2019, with English translation.

* cited by examiner

FIG.3

| COMPONENT | FAILURE MODE | SENSOR | DIAGNOSIS PARAMETER |
|---|---|---|---|
| MAIN SHAFT BEARING | BEARING DAMAGED | VIBRATION (HIGH) | EFFECTIVE VALUE |
| MAIN SHAFT BEARING | UNBALANCED | VIBRATION (LOW) | FIRST-ORDER ROTATIONAL FREQUENCY COMPONENT |
| MAIN SHAFT BEARING | UNBALANCED | VIBRATION (LOW) | SECOND-ORDER ROTATIONAL FREQUENCY COMPONENT |
| MAIN SHAFT BEARING | UNBALANCED | VIBRATION (LOW) | THIRD-ORDER ROTATIONAL FREQUENCY COMPONENT |
| MAIN SHAFT BEARING | MISALIGNED | AXIAL VIBRATION (LOW) | FIRST-ORDER ROTATIONAL FREQUENCY COMPONENT |
| MAIN SHAFT BEARING | MISALIGNED | AXIAL VIBRATION (LOW) | SECOND-ORDER ROTATIONAL FREQUENCY COMPONENT |
| MAIN SHAFT BEARING | MISALIGNED | AXIAL VIBRATION (LOW) | THIRD-ORDER ROTATIONAL FREQUENCY COMPONENT |
| SPEED UP GEAR | BEARING DAMAGED | VIBRATION (HIGH) | EFFECTIVE VALUE |
| SPEED UP GEAR | GEAR DAMAGED | VIBRATION (HIGH) | FIRST-ORDER MESHING FREQUENCY COMPONENT |
| SPEED UP GEAR | GEAR DAMAGED | VIBRATION (HIGH) | SECOND-ORDER MESHING FREQUENCY COMPONENT |
| SPEED UP GEAR | GEAR DAMAGED | VIBRATION (HIGH) | THIRD-ORDER MESHING FREQUENCY COMPONENT |
| POWER GENERATOR | BEARING DAMAGED | VIBRATION (HIGH) | EFFECTIVE VALUE |
| NACELLE | ABNORMAL VIBRATION | VIBRATION (LOW) | LOW FREQUENCY VIBRATIONAL COMPONENT |
| NACELLE | ABNORMAL VIBRATION | AXIAL VIBRATION (LOW) | LOW FREQUENCY VIBRATIONAL COMPONENT |

VIBRATION (HIGH): HIGH FREQUENCY VIBRATION SENSOR ATTACHED RADIALLY
VIBRATION (LOW): LOW FREQUENCY VIBRATION SENSOR ATTACHED RADIALLY
AXIAL VIBRATION (LOW): LOW FREQUENCY VIBRATION SENSOR ATTACHED AXIALLY

US 10,519,935 B2

CONDITION MONITORING SYSTEM AND WIND POWER GENERATION SYSTEM USING THE SAME

CROSS-REFERENCE TO RELATED APPLICATIONS

This application is the U.S. National Phase under 35 US.C. § 371 of International application No. PCT/JP2015/065592, filed on May 29, 2015, which claims the benefit of Japanese Application No. 2014-129052, filed on Jun. 24, 2014 and Japanese Application No. 2014-129057, filed on Jun. 24, 2014, the entire contents of each are hereby incorporated by reference.

TECHNICAL FIELD

The present invention relates to a condition monitoring system and a wind power generation system comprising the same, and particularly to a condition monitoring system which monitors a condition of equipment configuring a wind turbine and a wind power generation system comprising the same.

BACKGROUND ART

For example, patent document 1 discloses a condition monitoring system (CMS) which monitors a condition of a mechanical element of a wind turbine. This condition monitoring system takes in a signal of a vibration sensor provided to the mechanical element, records over a long period of time how a quantity of a condition representing a state of vibration in a rated operation (hereafter referred to as a diagnosis parameter) varies with time, and based on the diagnosis parameter's increase rate, a feature of the variation and the like, determines whether the mechanical element has a failure (see patent document 1).

CITATION LIST

Patent Documents

Patent document 1: Japanese Patent Laying-Open No. 2013-185507

SUMMARY OF INVENTION

Technical Problem

If the mechanical element does not have a failure, a diagnosis parameter may vary relatively significantly. If a threshold value applied to determine a failure of the mechanical element is increased with such a variation of the diagnosis parameter taken into consideration, sensing of an actually caused failure would be delayed. When sensing of an actually caused failure is delayed, other normal mechanical elements are also damaged, procuring replacement parts delays, and the like, and the wind turbine's operation may be stopped for an extended period of time.

The present inventors have obtained as a result of a variety of studies the finding that when a nacelle is pivoting, a mechanical element has large vibration and a diagnosis parameter significantly varies. Accordingly, when a failure diagnosis is performed based on a diagnosis parameter obtained while the nacelle does not rotate, a failure determination threshold value can be lowered to an appropriate level and in this regard a delay in sensing a failure can be suppressed.

However, in a location having a wind condition in which the direction of the wind is never fixed, a diagnosis parameter when the nacelle is not pivoting cannot be collected sufficiently, and as a result, failure sensing may be delayed.

Accordingly, a main object of the present invention is to provide a condition monitoring system capable of quickly and reliably detecting a failure of equipment configuring a wind turbine, and a wind power generation system including the same.

Solution to Problem

A condition monitoring system according to the present invention is a condition monitoring system which monitors a condition of equipment configuring a wind turbine. The wind turbine includes a nacelle rotatably supported on a top of a tower. The condition monitoring system comprises: a first detector configured to detect the condition of the equipment; a monitor device configured to generate a diagnosis parameter based on a detection result of the first detector; a controller configured to diagnose a failure of the equipment based on the diagnosis parameter; and a second detector configured to detect a rotation speed of the nacelle. The controller diagnoses whether the equipment has a failure by correcting the diagnosis parameter based on a detection result of the second detector and comparing the corrected diagnosis parameter with a predetermined threshold value.

Note that the rotation speed of the nacelle indicates the speed of the rotation of the nacelle, and includes both a number of rotations per unit time and a rotation angle per unit time.

Preferably, the controller is configured to correct the diagnosis parameter by using a correction function with the rotation speed of the nacelle used as a variable. The correction function is a function which corrects the diagnosis parameter so that as the nacelle has a higher rotation speed, a ratio of the diagnosis parameter after the correction to the diagnosis parameter before the correction becomes smaller.

Still preferably, the correction function is a function of a dimensionless diagnosis parameter obtained by dividing the diagnosis parameter by a diagnosis parameter obtained during non-rotation of the nacelle, the correction function using as a variable a dimensionless rotation speed of the nacelle which is obtained by dividing the rotation speed of the nacelle by a maximum speed thereof.

Preferably, the controller is configured to calculate an average value of the rotation speed of the nacelle in a predetermined period before the diagnosis, and correct the diagnosis parameter using the correction function based on the average value.

Preferably, the monitor device is configured to transmit to the controller the diagnosis parameter obtained in a first period before the diagnosis. The controller is configured to (i) store data received from the monitor device, (ii) when the first period ends, correct the diagnosis parameter of the first period based on the detection result of the second detector and (iii) generate the threshold value based on the corrected diagnosis parameter. More specifically, the controller determines a correction function for the diagnosis parameter when the first period ends, and, based on the correction function and a detection result of the second detector, the controller corrects any stored diagnosis parameter of the first period, and generates a threshold value based on the corrected diagnosis parameter. Furthermore, the monitor device is configured to transmit to the controller the diagnosis parameter obtained during a second period after the first period elapses. The controller is configured to correct the diagnosis parameter of the second period based on a detection result of the second detector in the second period and the correction function obtained when the first period ends, and diagnose whether the equipment has a failure by comparing the corrected diagnosis parameter with the threshold value.

A condition monitoring system according to the present invention is a condition monitoring system which monitors a condition of equipment configuring a wind turbine, the condition monitoring system comprising: a first detector configured to detect the condition of the equipment; a monitor device configured to generate a diagnosis parameter based on a detection result of the first detector; and a controller configured to diagnose a failure of the equipment based on the diagnosis parameter. The wind turbine includes: a blade converting wind power to a rotation torque of a main shaft; a nacelle housing a power generator converting the rotation torque of the main shaft to electric power; a tower supporting the nacelle rotatably; and a drive device configured to rotate the nacelle to cause the blade to face upwind. The diagnosis parameter varies as the nacelle rotates. The monitor device is configured to transmit to the controller the diagnosis parameter obtained in a first period before the diagnosis, and the controller is configured to generate a threshold value for diagnosing a failure of the equipment, based on the diagnosis parameter in an effective period of the first period. The monitor device is configured to transmit the diagnosis parameter to the controller in a second period after the first period elapses, and the controller is configured to diagnose whether the equipment has a failure based on the diagnosis parameter in the effective period of the second period and the threshold value.

Preferably, the effective period of the diagnosis parameter is a period in which the nacelle does not rotate.

Preferably, the effective period of the diagnosis parameter is a period in which an average value in magnitude of a rotating angular velocity of the nacelle per a predetermined time is smaller than a predetermined value.

Preferably, the condition monitoring system further comprises a second detector configured to detect a rotating angular velocity of the nacelle. The monitor device is configured to transmit a detected value of the second detector to the controller together with the diagnosis parameter. The controller is configured to determine whether a period in which the diagnosis parameter is generated is the effective period based on the detected value of the second detector.

Preferably, the controller is configured to correct the diagnosis parameter based on the rotation speed of the nacelle obtained from information from SCADA (Supervisory Control and Data Acquisition) separately monitoring the wind turbine.

Preferably, the second detector includes at least one of a direction sensor, a gyro sensor, and a GPS (Global Positioning System).

Furthermore, preferably, the second detector includes a detector to detect at least one of a driving current and a driving voltage of a drive device driving the nacelle.

Furthermore, according to the present invention, the wind power generation system includes a wind turbine and any condition monitoring system described above.

Advantageous Effects of Invention

In the condition monitoring system according to the present invention, since a diagnosis parameter is corrected based on a nacelle's rotation speed detected by a second detector, an increase of a variation of the diagnosis parameter that is introduced as the nacelle pivots can be suppressed. Thus, it is not necessary to make unnecessarily large a setting of a threshold value applied in diagnosing whether equipment has a failure and there is not caused a delay in sensing a failure of equipment that is introduced by making the threshold value unnecessarily large.

Furthermore, whether the nacelle may be rotated or stopped, a diagnosis parameter can be collected and a failure can be sensed, so that, when compared with a case where a failure is sensed based on a diagnosis parameter obtained only when the nacelle is stopped, equipment's failure can be early found. Thus, according to the present invention, a failure of equipment configuring the wind turbine can be quickly and reliably detected.

In another condition monitoring system according to the present invention, a period in which the nacelle of the wind turbine is stopped is set as an effective period of a diagnosis parameter, a threshold value is generated based on the diagnosis parameter of an effective period of a first period before a diagnosis, and whether equipment has a failure is diagnosed based on the diagnosis parameter of an effective period of a subsequent, second period, and the threshold value. Accordingly, the diagnosis parameter's threshold value can be set to be lower than conventional, and a failure of the wind turbine can be quickly detected.

In a still another condition monitoring system according to the present invention, a period in which an average value in magnitude of a rotating angular velocity of a nacelle of a wind turbine within a predetermined time is smaller than a predetermined value is set as an effective period of a diagnosis parameter, and a threshold value is generated based on the diagnosis parameter of an effective period of a first period before a diagnosis, and whether equipment has a failure is diagnosed based on the diagnosis parameter of an effective period of a subsequent, second period, and the threshold value. Accordingly, the diagnosis parameter's threshold value can be set to be lower than conventional, and a failure of the wind turbine can be quickly detected.

BRIEF DESCRIPTION OF DRAWINGS

FIG. 3 is a figure for illustrating a relationship of a sensor shown in FIG. 2 and a diagnosis parameter.

DESCRIPTION OF EMBODIMENTS

Hereinafter reference will be made to the drawings to describe the present invention more specifically. In the figures, identical or corresponding components are identically denoted and will not be described repeatedly.

First Embodiment

<General Configuration of Condition Monitoring System>

Figure 1:
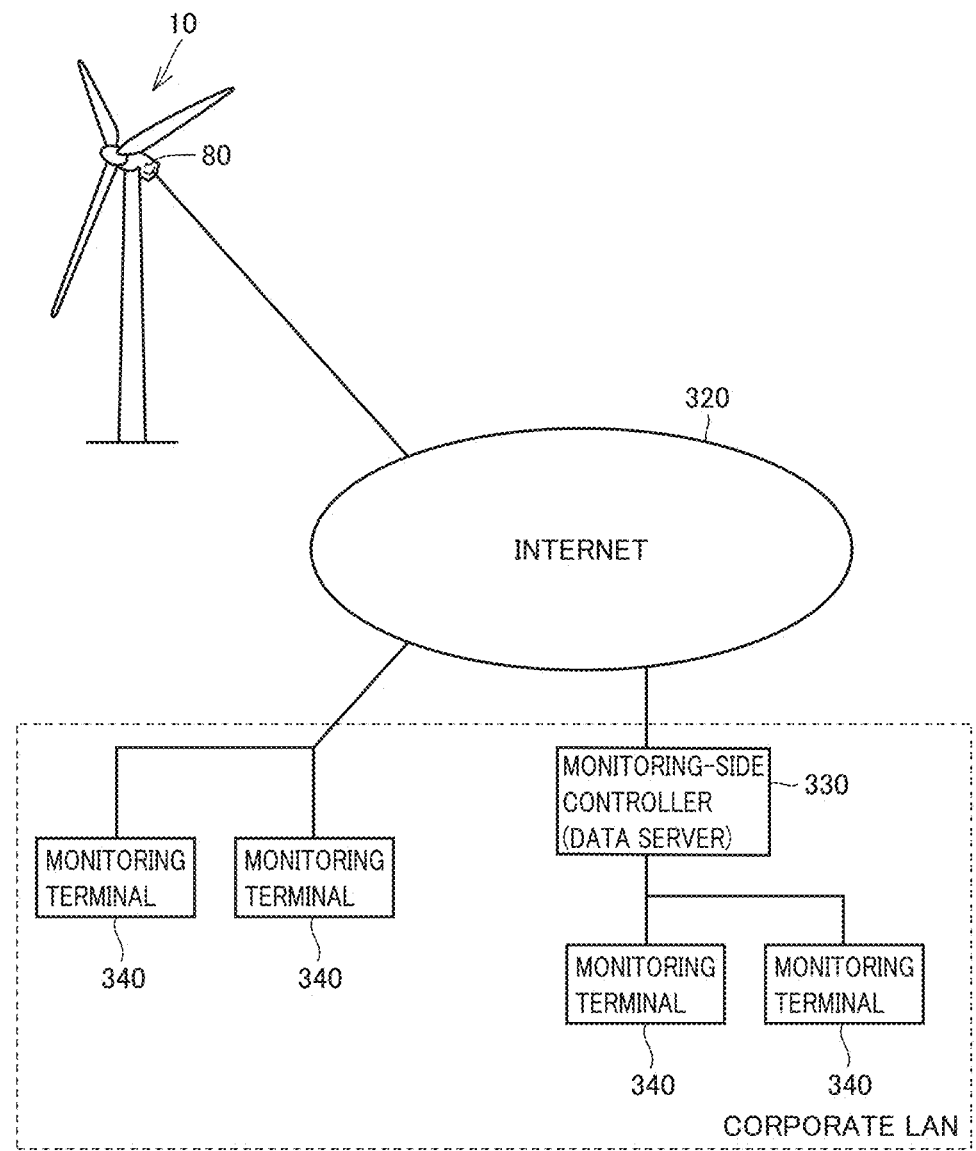
FIG. 1 is a block diagram showing a general configuration of a condition monitoring system according to a first embodiment of the present invention.

FIG. 1 schematically shows a general configuration of a condition monitoring system according to a first embodiment. With reference to FIG. 1, the condition monitoring system includes a monitor device 80, a data server (a monitoring-side controller) 330, and a monitoring terminal 340.

Monitor device 80 includes sensors 70A-70I (see FIG. 2) described later, calculates an effective value, a peak value, a crest factor, an effective value after an envelope process, a peak value after the envelope process, etc. from sensed values of the sensors, and transmits them to data server 330 via Internet 320.

While herein monitor device 80 and data server 330 are described as communicating via a wire, this is not exclusive, and they may communicate wirelessly.

Data server 330 and monitoring terminal 340 are connected via a corporate LAN (Local Area Network), for example. Monitoring terminal 340 is provided to view measurement data received by data server 330, conduct a detailed analysis of the measurement data, change a setting of the monitor device, and display a condition of each equipment of a wind turbine.

<Configuration of Wind Turbine>

Figure 2:
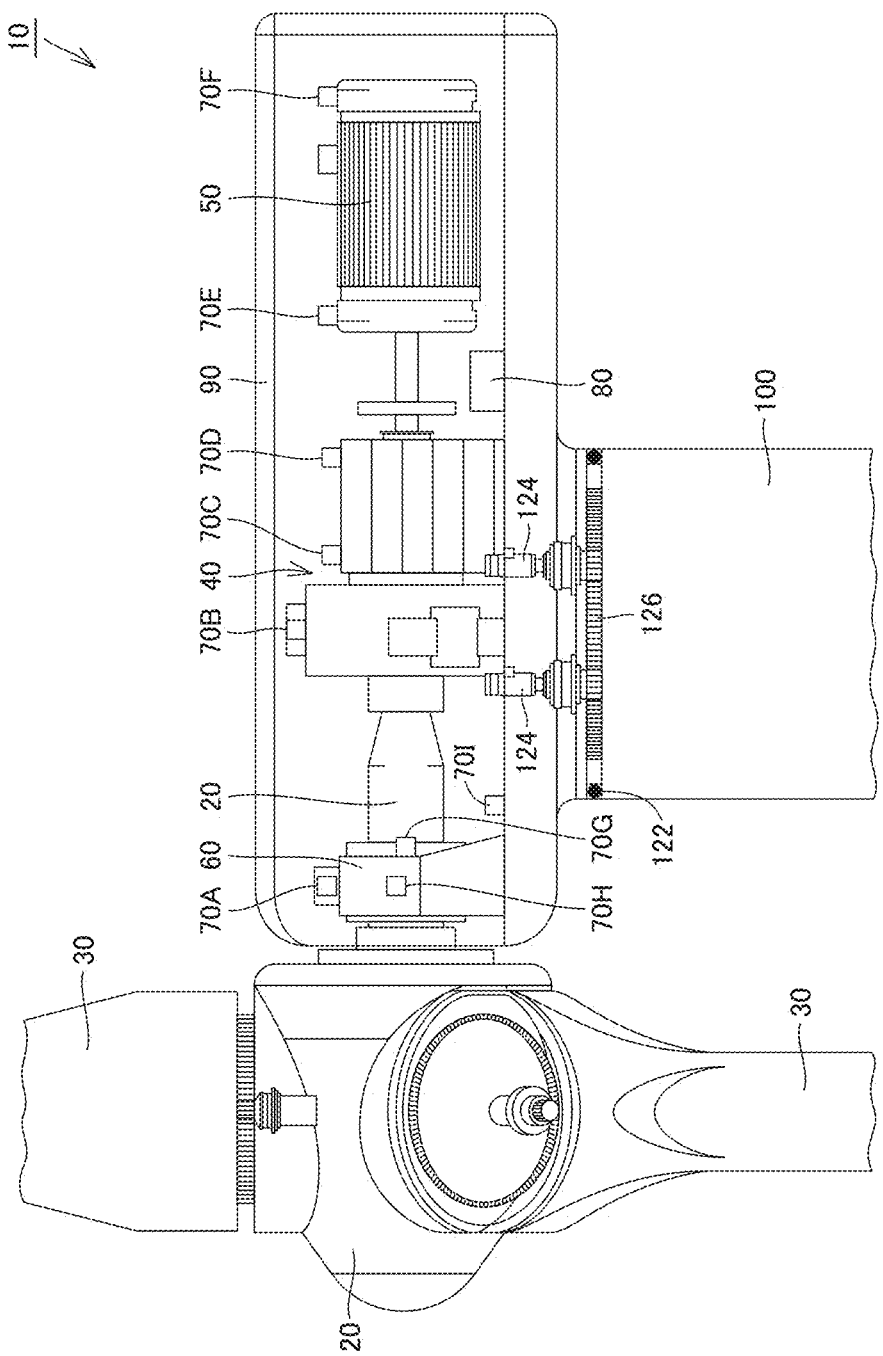
FIG. 2 shows a main portion of a wind turbine shown in FIG. 1.

FIG. 2 is a diagram schematically showing a configuration of a wind turbine 10. With reference to FIG. 2, wind turbine 10 includes a main shaft 20, a blade 30, a speed up gear 40, a power generator 50, a main shaft bearing 60, a nacelle 90, and a tower 100. Furthermore, wind turbine 10 includes sensors 70A-70I and monitor device 80. Speed up gear 40, power generator 50, main shaft bearing 60, sensors 70A-70I, and monitor device 80 are housed in nacelle 90, and nacelle 90 is supported by tower 100.

Main shaft 20 is inserted into nacelle 90, connected to the input shaft of speed up gear 40, and is rotatably supported by main shaft bearing 60. And main shaft 20 transmits rotation torque that is generated by blade 30 receiving wind power to the input shaft of speed up gear 40. Blade 30 is provided at an end of main shaft 20, converts wind power into rotation torque, and transmits it to main shaft 20.

Main shaft bearing 60 is disposed in nacelle 90 in a fixed manner and rotatably supports main shaft 20. Main shaft bearing 60 is a rolling bearing, and for example, it is a self-centering roller bearing, a conical roller bearing, a cylindrical roller bearing, a ball bearing, etc. Note that these bearings may be of a single row or double rows.

Sensors 70A-70I are disposed at each equipment in nacelle 90 in a fixed manner Specifically, sensor 70A is disposed on an upper surface of main shaft bearing 60 in a fixed manner and monitors a condition of main shaft bearing 60. Sensors 70B-70D are disposed on an upper surface of speed up gear 40 in a fixed manner, and monitor a condition of speed up gear 40. Sensors 70E and 70F are disposed on an upper surface of power generator 50 in a fixed manner, and monitor a condition of power generator 50. Sensor 70G is disposed at main shaft bearing 60 in a fixed manner, and monitors misalignment, and abnormal vibration of nacelle 90. Sensor 70H is disposed at main shaft bearing 60 in a fixed manner, and monitors unbalance, and abnormal vibration of the nacelle. Sensor 70I is disposed on a floor of nacelle 90, and senses a rotating angular velocity of nacelle 90, which may be a rotation speed thereof per unit time. Sensor 70I includes a gyro sensor which vibrates an element and senses angular velocity from Coriolis force exerted to the element, for example.

Speed up gear 40 is provided between main shaft 20 and power generator 50, accelerates a rotation speed of main shaft 20, and outputs it to power generator 50. As an example, speed up gear 40 is composed of a gear speed-up mechanism including a planetary gear, a countershaft, a high speed shaft, etc. Note that although not shown in the figure, speed up gear 40 is also provided therein with a plurality of bearings which support a plurality of shafts rotatably. Power generator 50 is connected to the output shaft of speed up gear 40, and generates electric power by the rotation torque received from speed up gear 40. Power generator 50 is an induction generator, for example. Note that power generator 50 is also provided therein with a bearing to support a rotor rotatably.

A nacelle rotation mechanism includes a drive device 124 attached on the side of nacelle 90 for changing the nacelle in direction, and a ring gear 126 rotated by a pinion gear fitted on a rotation shaft of drive device 124. Ring gear 126 is fixed to tower 100 and thus attached.

The nacelle rotation mechanism rotates nacelle 90 to change or adjust nacelle 90 in direction. Note that a bearing 122 for supporting the nacelle is provided at a boundary of nacelle 90 and tower 100. Nacelle 90 is supported by bearing 122 and rotates about the rotation axis of bearing 122. The rotation of nacelle 90 about the center axis of tower 100 is referred to as a yaw movement or yawing.

Monitor device 80 is provided inside nacelle 90, and receives data of each equipment's vibration, sound and AE (acoustic emission), a rotating angular velocity of nacelle 90 etc. sensed by sensors 70A-70I. Note that although not shown in the figure, sensors 70A-70I and monitor device 80 are connected by a cable.

Monitoring terminal 340 has a program previously stored therein to at least view measurement data stored in data server 330, conduct a detailed analysis of the measurement data, change a setting of monitor device 80, and display a condition of each equipment of wind turbine 10. On a screen of monitoring terminal 340, data about each equipment of wind turbine 10 is displayed which is useful for an expert of wind turbine 10 to make a decision.

Note that each component of monitoring terminal 340 is a general component. Accordingly, it can be said that an essential portion of the present invention is the above described software (or program) stored in a storage medium.

<Relationship Between Diagnosis Parameter and Failure Mode>

FIG. 3 is a figure for illustrating a relationship of a variety of types of data used in the first embodiment. FIG. 3 shows a relationship between a portion (or a component) of wind turbine 10, a failure mode, a sensor, and a diagnosis parameter calculated from the sensor's measurement data.

Specifically, as shown in FIG. 2 and FIG. 3, for main shaft bearing 60, data measured by a high frequency vibration sensor 70A provided to main shaft bearing 60 is used to allow monitor device 80 to calculate an effective value as a diagnosis parameter, and when the calculated effective value exceeds a corresponding threshold value, monitoring terminal 340 displays that main shaft bearing 60 has a damage.

Furthermore, for main shaft bearing 60, data measured by a low frequency vibration sensor 70H provided to measure radial vibration of main shaft bearing 60 is used to allow monitor device 80 to calculate a first-order rotational frequency component, a second-order rotational frequency component, and a third-order rotational frequency component as a diagnosis parameter, and when each calculated value exceeds a corresponding threshold value, monitoring terminal 340 displays that main shaft bearing 60 is unbalanced.

Furthermore, for main shaft bearing 60, data measured by a low frequency vibration sensor 70G provided to measure the main shaft's axial vibration is used to allow monitor device 80 to calculate a first-order rotational frequency component, a second-order rotational frequency component and a third-order rotational frequency component as a diagnosis parameter, and when each calculated value exceeds a corresponding threshold value, monitoring terminal 340 displays that main shaft bearing 60 is misaligned.

For speed up gear 40, data measured by high frequency vibration sensors 70B-70D is used to allow monitor device 80 to calculate an effective value as a diagnosis parameter, and when the calculated effective value exceeds a corresponding threshold value, monitoring terminal 340 displays that speed up gear 40 has a bearing damaged.

Furthermore, for speed up gear 40, data measured by high frequency vibration sensors 70B-70D is used to allow monitor device 80 to calculate a gear's first-order meshing frequency component, second-order meshing frequency component and third-order meshing frequency component as a diagnosis parameter, and when each calculated value exceeds a corresponding threshold value, monitoring terminal 340 displays that speed up gear 40 has the gear damaged.

For power generator 50, data measured by high frequency vibration sensors 70E and 70F is used to allow monitor device 80 to calculate an effective value as a diagnosis parameter, and when the calculated effective value exceeds a corresponding threshold value, monitoring terminal 340 displays that power generator 50 has a bearing damaged.

For nacelle 90, data measured by a low frequency vibration sensor 70H provided to measure the main shaft's radial vibration is used to allow monitor device 80 to calculate a low frequency vibrational component as a diagnosis parameter, and when the calculated value exceeds a corresponding threshold value, monitoring terminal 340 displays that nacelle 90 abnormally vibrates.

Furthermore, for nacelle 90, data measured by low frequency vibration sensor 70G provided to measure the main shaft's axial vibration is used to allow monitor device 80 to calculate a low frequency vibrational component as a diagnosis parameter, and when the calculated value exceeds a corresponding threshold value, monitoring terminal 340 displays that nacelle 90 abnormally vibrates.

Note that in the condition monitoring system according to the first embodiment, rotation angle sensor 70I senses a rotating angular velocity $\omega$ (rad/s) of nacelle 90. And as nacelle 90 pivots, the measurement data of sensors 70A-70H varies, and in this condition monitoring system, a diagnosis parameter is corrected based on rotating angular velocity $\omega$ of nacelle 90. Specifically, when nacelle 90 has higher rotating angular velocity $\omega$, the measurement data of sensors 70A-70H and the diagnosis parameter based thereon significantly vary. Accordingly, in order to suppress the variation of the diagnosis parameter resulting as nacelle 90 pivots, the diagnosis parameter is corrected so that when nacelle 90 has higher rotating angular velocity $\omega$, a ratio of the diagnosis parameter after the correction to the diagnosis parameter before the correction is smaller. This method of correcting a diagnosis parameter will be described more specifically later.

Note that the above measurement items are partially extracted for ease of understanding, and are not exclusive. Measurement data of a vibration sensor, an AE sensor, a temperature sensor, and a sound sensor may be used to calculate an effective value, a peak value, an average value, a crest factor, an effective value after an envelope process, and a peak value after the envelope process by using a statistical method, and the calculated values may be compared with corresponding threshold values to understand a condition of equipment of wind turbine 10 and cause monitoring terminal 340 to display the equipment's condition.

<Operation of Condition Monitoring System>

An operation of the condition monitoring system according to the first embodiment will be described below. The condition monitoring system includes a process in a basic data collecting period for setting a diagnostic operating condition of wind turbine 10 (see FIG. 5), a process in a learning period after the basic data collecting period to generate a threshold value applied in determining whether operation measurement data which satisfies the diagnostic operating condition is abnormal or not (see FIG. 6), and a process in a service period after the learning period to actually operate wind turbine 10 in service and use the threshold value generated in the learning period to monitor a condition of wind turbine 10 (see FIG. 7).

Note that in each of the above processes, a diagnosis parameter calculated from measurement data of various sensors as will be described hereinafter is used, and in the condition monitoring system according to the first embodiment, a diagnosis parameter is corrected based on the rotating angular velocity $\omega$ of nacelle 90, as has been described above. Hereinafter, this diagnosis parameter correction process will first be described.

(Diagnosis Parameter Correction Process)

The diagnosis parameter correction process is performed in data server 330 (see FIG. 1). Data server 330 receives a sensed value of rotating angular velocity $\omega$ (rad/s) of nacelle 90 from sensor 70I, and calculates an average value $\omega a$ in absolute value of rotating angular velocity $\omega$ based on the following expression (1):

$$\omega_a = \frac{1}{T_2 - T_1} \int_{T_1}^{T_2} |\bar{\omega}(t)| dt, \quad (1)$$

where t represents time, and T1 and T2 represent a measurement start time and a measurement end time, respectively, and a time (T2−T1) is set to a predetermined time. Note that time (T2−T1) may be set as appropriate depending on a diagnosis target (the main shaft bearing, the speed up gear, etc.). Furthermore, data server 330 divides value ωa by a maximum value ωaMax of rotating angular velocity ω to calculate a dimensionless rotating angular velocity Ω of nacelle 90.

$$\Omega = \left| \frac{\omega_a}{\omega_{aMax}} \right|. \quad (2)$$

Note that maximum value ωaMax may be a set value of a specification of wind turbine 10, or may be a maximum value of an actually measured value of rotating angular velocity ω collected in the below-described basic data collecting period.

Figure 4:
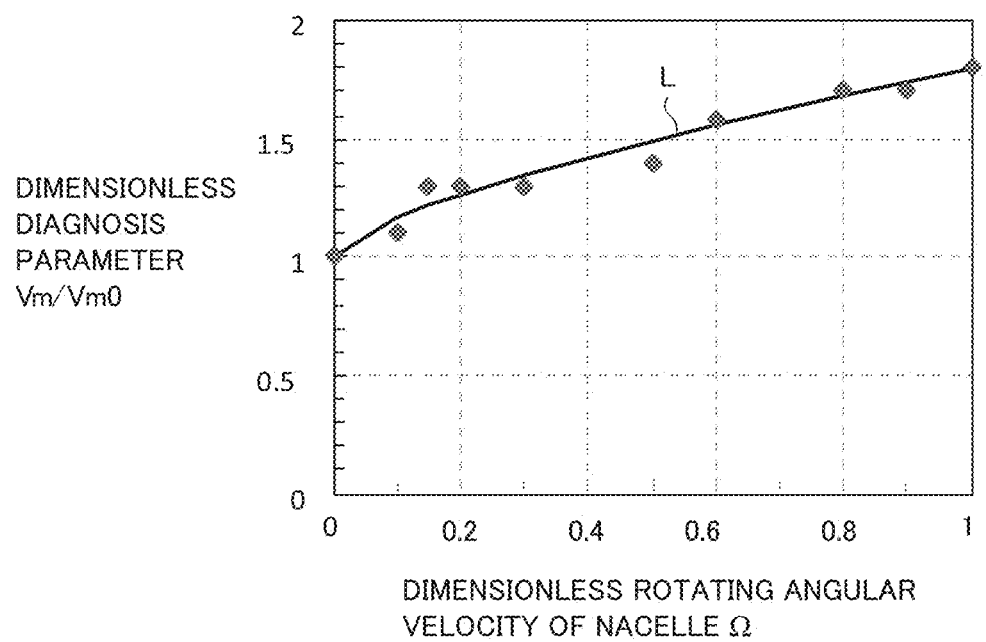
FIG. 4 represents a relationship between a dimensionless diagnosis parameter and a dimensionless rotating angular velocity of a nacelle.

When a dimensionless diagnosis parameter (Vm/Vm0) obtained by dividing a diagnosis parameter Vm calculated from the measurement data of each type of sensor by an average value Vm0 of the diagnosis parameter obtained while nacelle 90 does not rotate is marshaled with respect to the above dimensionless rotating angular velocity Ω of nacelle 90, a relationship is observed between the dimensionless diagnosis parameter (Vm/Vm0) and dimensionless rotating angular velocity Ω of nacelle 90, as shown in FIG. 4.

FIG. 4 represents the relationship between the dimensionless diagnosis parameter (Vm/Vm0) and dimensionless rotating angular velocity Ω of nacelle 90. Note that the data shown in this FIG. 4 is data collected when each equipment does not have failure, i.e., in a normal operation. With reference to FIG. 4, Vm0 represents a value of a diagnosis parameter obtained while nacelle 90 does not rotate, and accordingly, when rotating angular velocity Ω is 0, dimensionless diagnosis parameter (Vm/Vm0) has a value of 1. And as rotating angular velocity Ω increases, the value of dimensionless diagnosis parameter (Vm/Vm0) increases.

This FIG. 4 shows an upward tendency of diagnosis parameter Vm up to a maximum rotating angular velocity (Ω=1) of nacelle 90 with reference to value Vm0 of a diagnosis parameter obtained while nacelle 90 does not rotate. By correcting a diagnosis parameter to remove a variation increment of the diagnosis parameter caused as nacelle 90 pivots, a variation of the diagnosis parameter caused by a failure of equipment can be accurately estimated.

Accordingly, in the condition monitoring system according to the first embodiment, based on the data shown in FIG. 4, an approximation function L (a correction function) is calculated which represents a relationship between the dimensionless diagnosis parameter (Vm/Vm0) and dimensionless rotating angular velocity Ω of nacelle 90. And by dividing diagnosis parameter Vm by a value of approximation function L (or the correction function) depending on rotating angular velocity Ω actually measured, the diagnosis parameter is corrected.

This suppresses an effect of pivoting of nacelle 90 on the diagnosis parameter, and a threshold value for performing a failure diagnosis can be set without considering a variation of a vibration parameter resulting as nacelle 90 pivots. More specifically, it is not necessary to set the threshold value to an unnecessarily large value in consideration of the variation of the vibration parameter resulting as nacelle 90 pivots. This allows the threshold value for the failure diagnosis to be lowered to an appropriate level, and thus allows early failure detection to be done in the failure diagnosis.

Note that a variety of functions can be adopted for approximation function (correction function) L representing the relationship between the dimensionless diagnosis parameter (Vm/Vm0) and dimensionless rotating angular velocity Ω of nacelle 90. In the first embodiment, the following function is used as an example.

$$F_V(\Omega) = \frac{V_m}{V_{m0}} = \left( \frac{V_{m1}}{V_{m0}} - 1 \right) \Omega^\alpha + 1, \quad (3)$$

where Vm1 represents a value of diagnosis parameter Vm when dimensionless rotating angular velocity Ω of nacelle 90 is 1 (i.e., ωa=ωaMax), and α is a constant. Constant α is determined based on an actually measured value of diagnosis parameter Vm, and for example, it is determined based on a regression formula of the data represented in FIG. 4.

And diagnosis parameter Vm is corrected using the correction function represented by the expression (3), as follows:

$$V_{rec} = \frac{V_m}{F_V(\Omega)} = \frac{V_m}{\left( \frac{V_{m1}}{V_{m0}} - 1 \right) \Omega^\alpha + 1}. \quad (4)$$

Vrec represents the diagnosis parameter that has been corrected based on rotating angular velocity ω of nacelle 90. And in the first embodiment, in a process performed when the learning period ends and in the service period, a process for correcting diagnosis parameter Vm is performed and each process is performed based on corrected diagnosis parameter Vrec. Hereinafter, each process in the basic data collecting period, the learning period, and the service period will be described.

(Process in Basic Data Collecting Period)

The basic data collecting period is a period to collect basic data required in determining a diagnostic operating condition of wind turbine 10. A process done in the basic data collecting period will be described.

Figure 5:
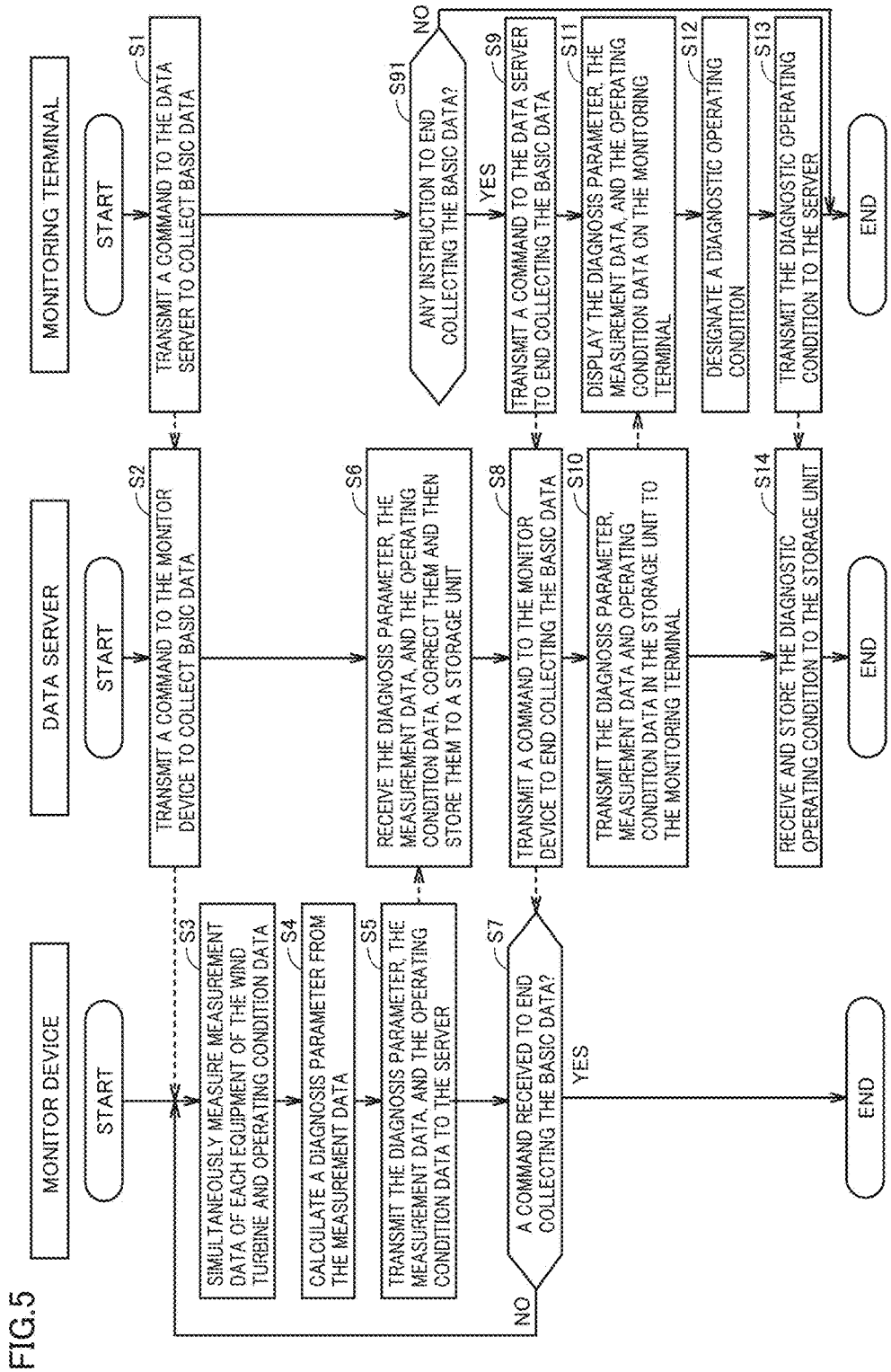
FIG. 5 is a flowchart which represents an operation of the condition monitoring system shown in FIG. 1 during a basic data collecting period.

FIG. 5 is a flowchart for illustrating the process in the basic data collecting period. With reference to FIG. 5, when an operation of wind turbine 10 is started and a person in charge operates monitoring terminal 340 to transmit a command to data server 330 to collect basic data (step S1), the command to collect the basic data is transmitted via data server 330 to monitor device 80 (step S2). Monitor device 80 receives the command to collect the basic data, and in response, collects a variety of types of data such as vibration of each equipment of wind turbine 10 (hereinafter referred to as measurement data) and a variety of types of data such as the rotation speed of blade 30, rotating angular velocity ω of nacelle 90, and a power generating current (hereinafter referred to as operating condition data) simultaneously (Step S3), calculates diagnosis parameter Vm from the measurement data which is the variety of types of data such as vibration (step S4), and transmits diagnosis parameter Vm, the measurement data, and the operating condition data to data server 330 (step S5).

Data server 330 stores diagnosis parameter Vm, the measurement data, and the operating condition data to a storage unit (step S6). This process of the measurement of the measurement data and the operating condition data (step S3), the calculation of the diagnosis parameter (step S4), the transmission to data server 330 (step S5), and the storage to the storage unit in data server 330 (step S6) is continued until step S7 where monitor device 80 receives a command from monitoring terminal 340 to end collecting the basic data (step S7; NO).

Note that the operating condition data is not limited to the rotation speed and the power generating current, and also includes a physical quantity characterizing an operational condition of wind turbines 10, such as wind speed, torque of a shaft of the power generator, etc.

Furthermore, the measurement data is not limited to vibration, and also includes a physical quantity which represents a condition of equipments, such as AE, temperature, and sound.

When the person in charge operates monitoring terminal 340 to issue an instruction to end collecting the basic data (step S91; YES) a command to end collecting the basic data is transmitted from monitoring terminal 340 to data server 330 (step S9). In response, as has been described above, monitor device 80 ends collecting the basic data, and the process ends (step S7; YES). Simultaneously, data server 330 transmits all of the diagnosis parameter, measurement data and operating condition data collected during the basic data collecting period to monitoring terminal 340 (step S10). Note that when the person in charge does not issue an instruction via monitoring terminal 340 to end collecting the basic data, (step S91; NO), the process ends as it is.

Monitoring terminal 340 displays the diagnosis parameter, the measurement data, and the operating condition data (step S11), and the person in charge sees the diagnosis parameter and the operating condition data and designates a diagnostic operating condition (step S12). Note that the diagnostic operating condition is an operating condition under which the condition monitoring system conducts a diagnosis. For example when the diagnostic operating condition is designated such that the main shaft's rotation speed is 12 rpm to 17 rpm and the power generating current is 300 A to 1000 A, a variety of types of data of a rotation speed and a power generating current (i.e., the operating condition data) is measured, and if the main shaft of wind turbine 10 has a rotation speed in a range of 12 to 17 rpm and the power generating current is in a range of 300 A to 1000 A, the operating condition satisfies the diagnostic operating condition, and accordingly, from simultaneously measured measurement data a diagnosis parameter is calculated and compared with a threshold value corresponding to the diagnosis parameter to make a diagnosis. Note that when the operating condition does not satisfy the diagnostic operating condition, the condition of each equipment of wind turbine 10 is not diagnosed. Note that a plurality of diagnostic operating conditions can be designated.

In monitoring terminal 340, the designated diagnostic operating condition is transmitted to data server 330 (step S13), and data server 330 stores the diagnostic operating condition to the storage unit (step S14). Thus, a process in monitoring terminal 340 and data server 330 in the basic data collecting period ends.

(Process in Learning Period)

The learning period is a period in which after the basic data collecting period required in determining the diagnostic operating condition of wind turbine 10, as has been described above, has elapsed, a threshold value for determining a condition of each equipment of wind turbine 10 is generated. A process in this learning period will be described.

Figure 6:
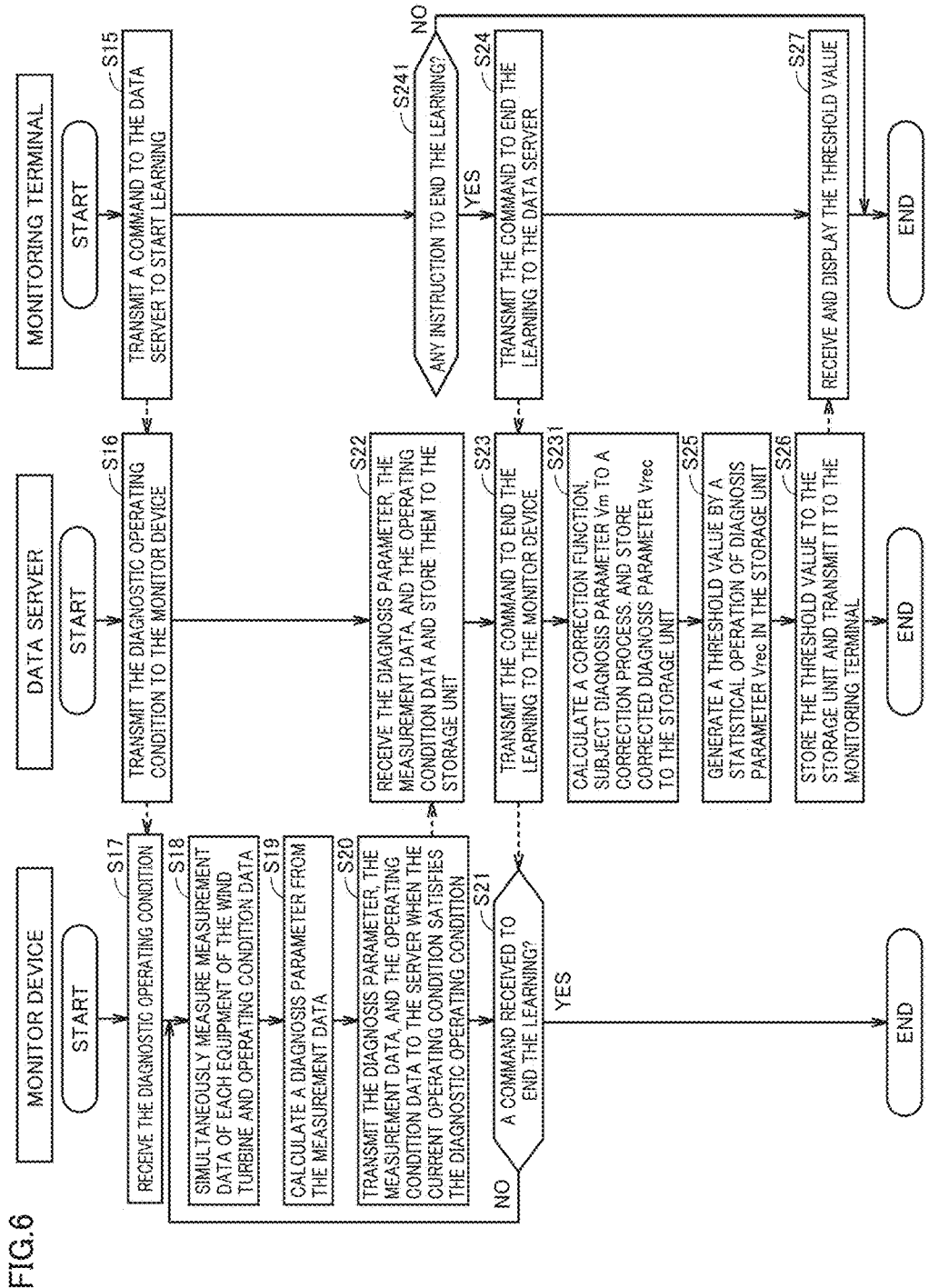
FIG. 6 is a flowchart which represents an operation of the condition monitoring system shown in FIG. 1 during a learning period.

FIG. 6 is a flowchart for illustrating a process in the learning period of wind turbine 10. With reference to FIG. 6, when the person in charge operates monitoring terminal 340 to issue an instruction to start the learning, a command to start the learning is transmitted from monitoring terminal 340 to data server 330 (step S15). Data server 330 receives the command to start the learning, and in response, reads the diagnostic operating condition stored in the storage unit and transmits it to monitor device 80 (step S16). Monitor device 80 receives the diagnostic operating condition (step S17), and in response, measures measurement data and operating condition data simultaneously (step S18). And monitor device 80 calculates diagnosis parameter Vm from the measurement data which is a variety of types of data such as vibration (step S19).

When the current operating condition satisfies the diagnostic operating condition, monitor device 80 transmits diagnosis parameter Vm, the measurement data, and the operating condition data to data server 330 (step S20). Data server 330 receives diagnosis parameter Vm, the measurement data, and the operating condition data, and stores them to the storage unit (step S22). This process of the measurement of the measurement data and the operating condition data (step S18), the calculation of the diagnosis parameter (step S19), the transmission to data server 330 (step S20), and the storage to the storage unit in data server 330 (step S22) is continued until step S21 where monitor device 80 receives a command from monitoring terminal 340 to end the learning (step S21; NO).

When the person in charge operates monitoring terminal 340 to issue an instruction to end the learning (step S241; YES) a command to end the learning is transmitted from monitoring terminal 340 to data server 330 (step S24). Data server 330 transmits the command to monitor device 80 to end the learning (step S23), and monitor device 80 ends collecting the measurement data and the operating condition data, and the process ends (step S21; YES). Simultaneously, data server 330 determines the correction function represented by the above the above expression (3). Specifically, data server 330 determines ωaMax, Vm0, and Vm1 under an operating condition of interest, and finally calculates constant α of the correction function. And data server 330 subjects a variety of diagnosis parameters Vm stored in the storage unit to a correction process according to the above expression (4) to generate corrected diagnosis parameter Vrec and store it to the storage unit (step S231). By a statistical operation of diagnosis parameter Vrec stored in the storage unit, data server 330 automatically generates a threshold value for the diagnosis parameter for each diagnostic operating condition (step S25). The threshold value is stored to the storage unit of data server 330, and transmitted to monitoring terminal 340 (step S26). Monitoring terminal 340 receives the threshold value and displays it on a display unit of a monitor or the like (step S27), and the person in charge can confirm the threshold value. Thus, a process in data server 330 and monitor device 80 in the learning period ends. Note that when the person in charge does not issue an instruction via monitoring terminal 340 to end the learning, (step S241; NO), the process ends as it is.

Note that the basic data collecting and learning periods for generating a threshold value can be changed as desired.

Using measurement data obtained when each equipment of wind turbine 10 is in a normal condition, the threshold value is generated for each equipment of wind turbine 10 for each diagnostic operating condition.

Here, for ease of understanding, as a specific example, a case will be more specifically described hereinafter in which under a certain diagnostic operating condition, a threshold value in two stages is generated for one equipment of a single wind turbine 10.

It is assumed that in step S22, diagnosis parameter Vrec has a plurality of values stored in the storage unit, and the plurality of diagnosis parameters have an average value $\mu_0$ and a standard deviation $\sigma_0$. For example, a first threshold value CT is assumed to be $\mu_0+3\sigma_0$, and a second threshold value WN is assumed to be 3 times of the first threshold value. First threshold value CT and second threshold value WN are represented by the following expressions (5) and (6), respectively:

$$CT=\mu_0+3\sigma_0 \quad (5); \text{ and}$$

$$WN=3(\mu_0+3\sigma_0) \quad (6).$$

Using threshold values CT and WN, diagnosis parameter Vrec of a service period described later is used to allow data server 330 to determine whether the condition of each equipment of wind turbine 10 is in a condition with a failure, and a result thereof is displayed on monitoring terminal 340. For example, when threshold value CT is exceeded, monitoring terminal 340 displays an indication such as "caution" to indicate that corresponding equipment is in an abnormal condition. Furthermore, when threshold value WN is exceeded, monitoring terminal 340 displays an indication such as "warning" to indicate that corresponding equipment is in a condition with a failure having a large extent.

The threshold value divided into two stages allows a classification to be easily done such that for measurement data smaller than threshold value CT, an expert's decision is not required, whereas for measurement data larger than threshold value WN, it is necessary for the expert to carefully determine the condition of each equipment of wind turbine 10, and when measurement data falls between threshold value CT and threshold value WN, for example, whether to have the expert make a diagnosis can be determined while the condition of each equipment of wind turbine 10 is observed.

Such a configuration can dispense with a resident expert and thus reduce cost.

Note that while the threshold value is described as having a level divided into two stages, the threshold value's level is not limited thereto and may have more levels.

(Process in Service Period)

The service period is a period in which after the learning period has elapsed, wind turbine 10 is actually operated in service and a threshold value generated in the learning period is used to monitor a condition of wind turbine 10. A process in the service period will be described.

Figure 7:
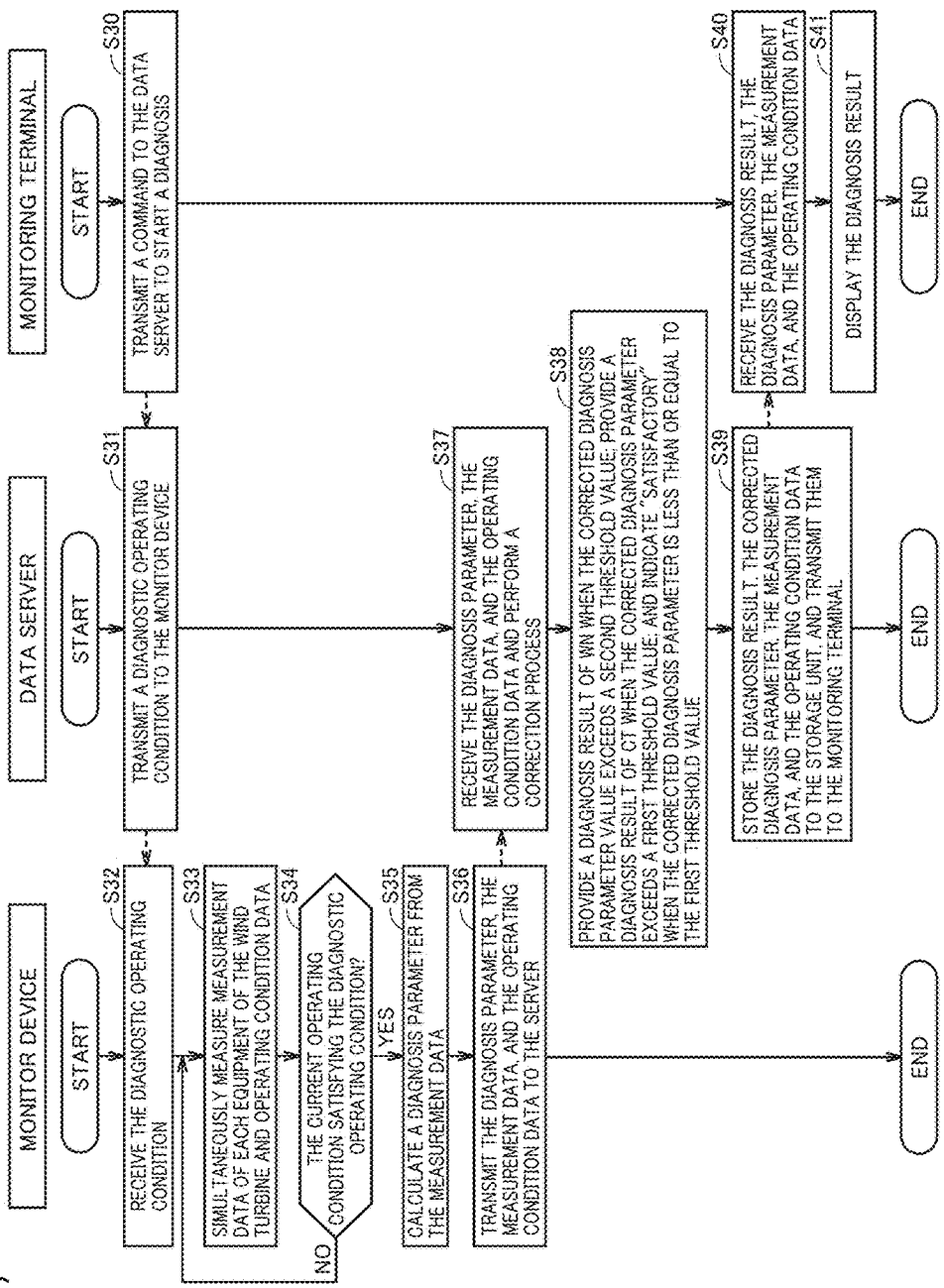
FIG. 7 is a flowchart which represents an operation of the condition monitoring system shown in FIG. 1 during a service period.

FIG. 7 is a flowchart for illustrating the process in the service period. With reference to FIG. 7, from monitoring terminal 340, a person in charge transmits to data server 330 a command to start a diagnosis of a condition of each equipment of wind turbine 10 (a command to start a diagnosis) (step S30). Data server 330 receives the command to start the diagnosis, and transmits a diagnostic operating condition to monitor device 80 (step S31).

Monitor device 80 receives the diagnostic operating condition (step S32), and measures measurement data such as vibration data in each equipment of wind turbine 10, and operating condition data such as the rotation speed of main shaft 20, rotating angular velocity $\omega$ of nacelle 90, and a power generating current simultaneously (Step S33).

Monitor device 80 determines whether the current operating condition satisfies the diagnostic operating condition (step S34). And when the current operating condition satisfies the diagnostic operating condition (step S34; YES), monitor device 80 calculates a diagnosis parameter from the measurement data (step S35), and transmits the diagnosis parameter, the measurement data, and the operating condition data to data server 330 (step S36). In contrast, if the current operating condition does not satisfy the diagnostic operating condition (step S34; NO) the control returns to step S33 to again measure the measurement data and the operating condition data.

Thus, only when the current operating condition satisfies the diagnostic operating condition, monitor device 80 transmits diagnosis parameter Vm, the measurement data, and the operating condition data to data server 330.

Data server 330 receives diagnosis parameter Vm, the measurement data, and the operating condition data, and subjects diagnosis parameter Vm to the correction process according to the above expression (4).

Data server 330 then determines the condition of each equipment of wind turbine 10 based on corrected diagnosis parameter Vrec and a threshold value generated during the learning period. For example, when corrected diagnosis parameter Vrec exceeds second threshold value WN, data server 330 provides a diagnosis result of WN, whereas when corrected diagnosis parameter Vrec exceeds first threshold value CT, data server 330 provides a diagnosis result of CT (step S38). And data server 330 stores this diagnosis result, corrected diagnosis parameter Vrec, the measurement data, and the operating condition data to the storage unit, and transmits these pieces of data to monitoring terminal 340 (step S39).

Monitoring terminal 340 receives the diagnosis result, the diagnosis parameter value, the measurement data, and the operating condition data (step S40), and displays the diagnosis result. When the diagnosis result is WN, "warning" is displayed, whereas when the diagnosis result is CT, "caution" is displayed, otherwise "satisfactory" is displayed (step S41).

Furthermore, when the diagnosis result is WN or CT, an e-mail can be transmitted to the person in charge to ensure that he/she is informed of an abnormal condition.

When wind turbine 10 is operated in a different method, it is necessary to change a diagnostic operating condition, a threshold value, etc. Such a case can also be handled by following the procedure of FIG. 5 from step S1 to change the diagnostic operating condition to set a new threshold value. Note that the threshold value can be changed by the person in charge via monitoring terminal 340.

Note that since in step S40 of FIG. 7 monitoring terminal 340 receives a diagnosis result and together therewith a diagnosis parameter value and measurement data, monitoring terminal 340 can easily provide an expert with the latest and optimal measurement data etc. which can be assessed and analyzed by the expert, and furthermore, monitoring terminal 340 can provide an environment allowing the measurement data etc. and data associated therewith to be simultaneously displayed on a monitor (not shown).

Accordingly, the expert can easily determine, based on an image from the monitor, whether a detailed diagnosis is required.

(Measurement Result Displayed on Monitor of Monitoring Terminal)

Figure 8:
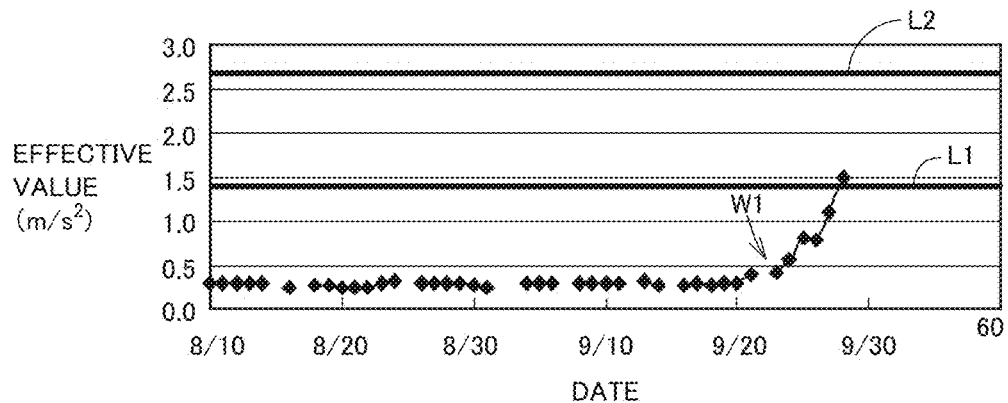
FIG. 8 represents how a value of a diagnosis parameter displayed on a monitor of a monitor terminal shown in FIG. 1 varies with time.

FIG. 8 represents how a value of a diagnosis parameter displayed on a monitor of monitoring terminal 340 varies with time. With reference to FIG. 8, the axis of ordinate represents an effective value and the axis of abscissa represents dates for past 60 days. Furthermore, a waveform W1 represents an exemplary temporal variation of a diagnosis parameter, and solid lines L1 and L2 represent threshold values at which each equipment has a first condition (the "caution" condition set forth above) and a second condition (the "warning" condition set forth above), respectively, indicated together with waveform W1.

For example, causing a display unit (not shown) of monitoring terminal 340 to display a value of a diagnosis parameter over time allows an expert to understand that the effective value increases around September 20, and that before September 30, corresponding equipment's effective value exceeds the "caution" condition, and determine that for this equipment a further detailed diagnosis is required.

Note that even if these threshold values are not exceeded, such an estimation that the diagnosis parameter's latest value has an upward tendency, has some margin under a threshold value although the value has an upward tendency, etc. can be made.

Figure 9:
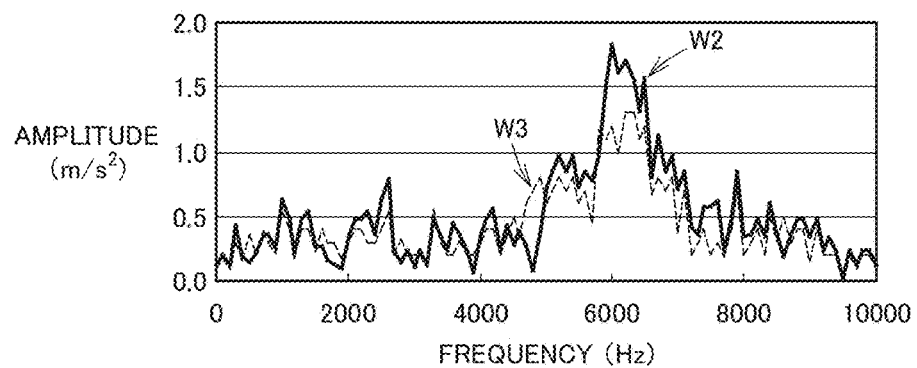
FIG. 9 shows a frequency spectrum under a certain operating condition displayed on the monitor of the monitoring terminal shown in FIG. 1.

FIG. 9 shows a frequency spectrum displayed on the monitor of monitoring terminal 340 under a certain operating condition.

In FIG. 9, a waveform W2 represents the latest measurement data and a waveform W3 represents a normal data frequency spectrum of any date and time (in the past). Note waveforms W2 and W3 were measured under identical operating conditions, respectively. In order to accurately understand the circumstances of the equipment represented by waveform W2, monitoring terminal 340 displays waveform W2 above and together therewith waveform W3 simultaneously for comparison. This allows an expert to compare waveform W2 with waveform W3 to easily understand whether equipment to be monitored is in a condition close to a normal condition or an abnormal condition and thus evaluate the measurement data in a short period of time.

Figure 10:
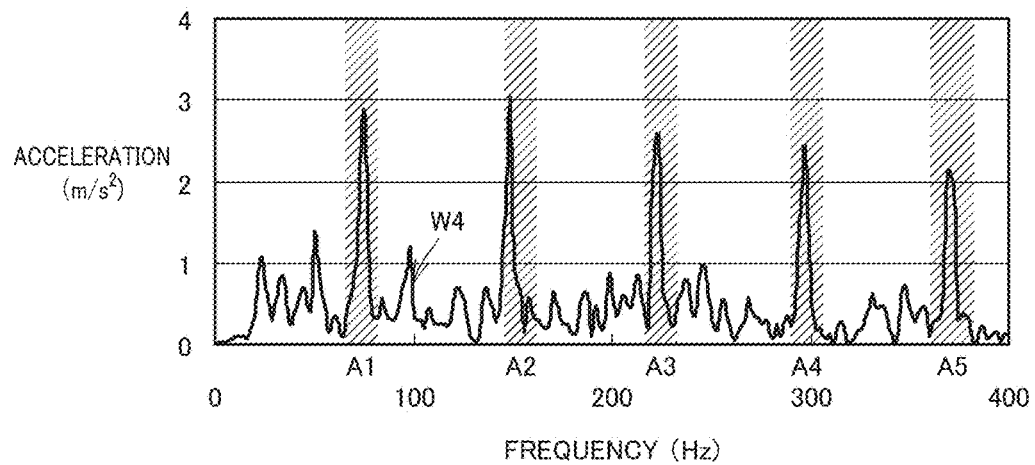
FIG. 10 shows a vibration envelope spectrum of measurement data displayed on the monitor of the monitoring terminal shown in FIG. 1.

FIG. 10 shows a vibration envelope spectrum of measurement data displayed on the monitor of monitoring terminal 340. With reference to FIG. 10, frequency domains A1 to A5 (hatched portions) represent domains including defect frequencies (outer ring defect frequencies) of first to fifth orders each with a tolerable range of 5%, and they are displayed together with a waveform W4.

Such a tolerable range is provided because when the time when the rotation speed is measured and that when vibration is measured are offset or the rotation speed varies between the start of measuring vibration and the end of doing so, or the like, a measured frequency spectrum is different from a previously calculated defect frequency, and even in such a case, a condition of each equipment of wind turbine 10 with a failure can be detected.

Such a previously calculated defect frequency with a tolerable range included facilitates detecting a failure (or a defect) of each equipment of wind turbine 10. In particular, a wind turbine varies in rotation speed, and accordingly, when setting the tolerable range, it is preferable to provide it depending on how the rotation speed varies.

Note that the above described defect frequency for example includes a frequency generated when an outer ring has a defect (an outer ring defect frequency Fo), a frequency generated when an inner ring has a defect (an inner ring defect frequency Fi) and a frequency generated when a rolling element has a defect (a ball defect frequency Fb), and these are previously calculable by the following expressions (7) to (9):

$$Fo=(Fr/2)\times(1-(d/D)\times\cos\alpha)\times z \qquad (7),$$

$$Fi=(Fr/2)\times(1+(d/D)\times\cos\alpha)\times z \qquad (8), \text{ and}$$

$$Fb=(Fr/2)\times(D/d)(1-(d/D)2\times\cos 2\alpha) \qquad (9),$$

where "Fr" represents a rotational frequency (Hz), "d" represents the rolling element's diameter (mm), "D" represents a pitch diameter (mm), "α" represents a contact angle, and "z" represents the number of rolling elements. Furthermore, a defect frequency of an n-th order can be obtained by calculating n×Fo, n×Fi, and n×Fb, where n represents a natural number.

Figure 11:
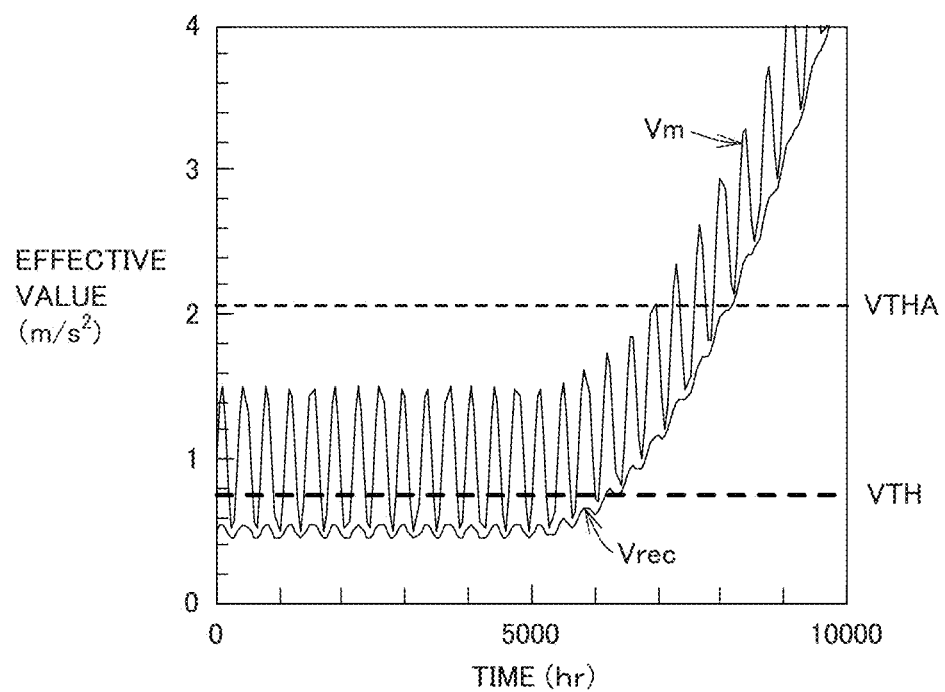
FIG. 11 is a figure for illustrating an effect of the present embodiment.

FIG. 11 shows an effect of the first embodiment. This figure represents a variation of diagnosis parameter Vm, which is not corrected in accordance with rotating angular velocity ω of nacelle 90, with time and a conventional threshold value VTHA, and a variation of diagnosis parameter Vrec, which is corrected in accordance with rotating angular velocity ω of nacelle 90, with time and threshold value VTH set in the first embodiment. As a diagnosis parameter, an effective value (m/s2) of a vibrational acceleration of main shaft bearing 60 calculated from the measurement data of sensor 70A is indicated as an example.

Conventionally, diagnosis parameter Vm has been recorded without taking into consideration a variation of measurement data accompanying the rotation of nacelle 90, and accordingly, even at a normal time, the diagnosis parameter has a large variation. Threshold value VTHA for determining whether the diagnosis parameter is abnormal needs to be set to a value higher than a peak value of the diagnosis parameter obtained at the normal time, and accordingly, conventionally, it has been set to a relatively high value. As a result, a timing of sensing a failure of a mechanical element tends to be delayed, and while this delay is introduced, another normal mechanical element is damaged or procuring replacement parts delays and the like, and a period of time for which the wind turbine cannot be operated is extended or the like.

In contrast, in the first embodiment, diagnosis parameter Vm is corrected based on rotating angular velocity ω of nacelle 90 and corrected diagnosis parameter Vrec is used to perform each process in the learning period and the service period, and accordingly, an increase of a variation of the diagnosis parameter resulting as nacelle 90 rotates is suppressed. Thus, it is not necessary to make unnecessarily large a setting of a threshold value applied in diagnosing whether equipment has a failure and threshold value VTH can be set to a relatively low value, and accordingly, there is not caused a delay in sensing a failure of equipment that is introduced by making the threshold value unnecessarily large. Furthermore, whether nacelle 90 may be rotated or stopped, a diagnosis parameter can be collected and a failure can be sensed, so that, when compared with a case where a failure is sensed based on a diagnosis parameter obtained only when nacelle 90 is stopped, equipment's failure can be early found. Thus, according to the first embodiment, a failure of equipment configuring wind turbine 10 can be quickly and reliably detected.

Note that while in the first embodiment a threshold value for diagnosing whether each equipment of wind turbine 10 has a failure is generated during the learning period, such a learning period as described above may be dispensed with and a threshold value may separately be set based on a diagnosis parameter obtained through an experiment etc. In other words, it is not a requirement to generate the threshold value automatically in the learning period, and diagnosis parameter Vm obtained through an experiment etc. may be used to therefrom derive the above expression (4) which may in turn be used to calculate corrected diagnosis parameter Vrec, and threshold value VTH may be determined based thereon.

First Embodiment in Exemplary Variation

In the first embodiment in an exemplary variation, a diagnosis parameter is corrected according to the following expression (10) so that an amount of variation of the diagnosis parameter depending on the rotating angular velocity of nacelle 90 is small.

$$V_{rec} = V_{mes} \min[1, (\omega a - \omega a0) - B] \quad (10),$$

where $V_{rec}$ represents a corrected diagnosis parameter to be recorded, $V_{mes}$ represents an actually measured, uncorrected diagnosis parameter, min [1, ($\omega$a–$\omega$a0)–B] represents a function which returns the smaller one of 1 and ($\omega$a–$\omega$a0)–B, and A and B represent constants. A and B need to be set to allow Vrec to have a value unchanged as much as possible in response to variation of $\omega$a.

$\omega$a is a value calculated by the above expression (1), and $\omega$a0 is a predetermined value. The value of $\omega$a0 may be obtained through an experiment similarly as done in the first embodiment, or may be determined from an actual wind turbine's condition.

A process in the basic data collecting period in the condition monitoring system of the exemplary variation is performed according to a flowchart similar to that of the first embodiment shown in FIG. 5. Note, however, that in step S6, a diagnosis parameter undergoes a correction process according to the above expression (10).

Figure 12:
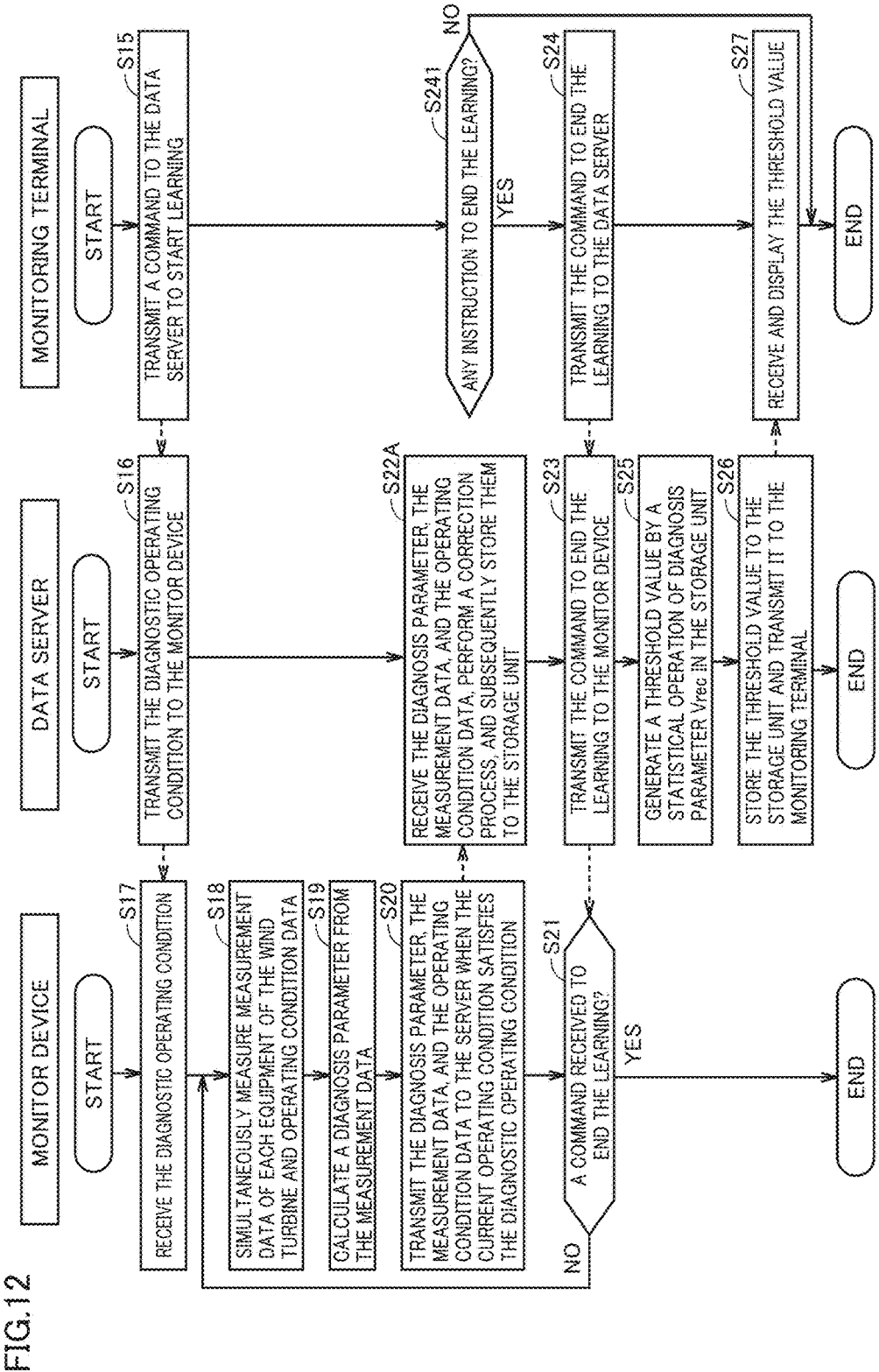
FIG. 12 is a flowchart of an operation of a condition monitoring system in an exemplary variation of the first embodiment during a learning period.

FIG. 12 is a flowchart for describing a process in the learning period in the condition monitoring system of the exemplary variation, as compared with FIG. 6. FIG. 12 is different from FIG. 6 in that Step S22 is substituted with step S22A, and furthermore, step S231 is deleted. In step S22A, data server 330 receives a diagnosis parameter, measurement data, and operating condition data, subjects the diagnosis parameter to a correction process according to the above expression (10), and stores the corrected diagnosis parameter, the measurement data, and the operating condition data to the storage unit.

A process in the service period in the condition monitoring system of the exemplary variation is performed according to a flowchart similar to that of the first embodiment shown in FIG. 7. Note that in step S37, a diagnosis parameter undergoes a correction process according to the above expression (10).

The remainder in configuration and operation is similar to that of the first embodiment, and accordingly, it will not be described repeatedly.

In the first embodiment in the exemplary variation, an amount of variation of a diagnosis parameter that accompanies rotation of nacelle 90 can be reduced, and a close threshold value which is advantageous in early failure detection can be set. Thus, as well as in the first embodiment, a failure of wind turbine 10 can be quickly detected.

Second Embodiment

In the first embodiment, an example of a case has been described in which, to suppress a diagnosis parameter's variation, the diagnosis parameter is corrected based on a nacelle's rotating angular velocity $\omega$ and the corrected diagnosis parameter is used to perform a process.

In a second embodiment, an example of a case will be described in which, by recording only a diagnosis parameter obtained for a prescribed period (hereinafter also referred to as an "effective period"), the diagnosis parameter's variation is suppressed to be small. Note that the second embodiment also provides a condition monitoring system having a basic configuration similar to that of the first embodiment, and accordingly, the similar configuration will not be described repeatedly.

Figure 13:
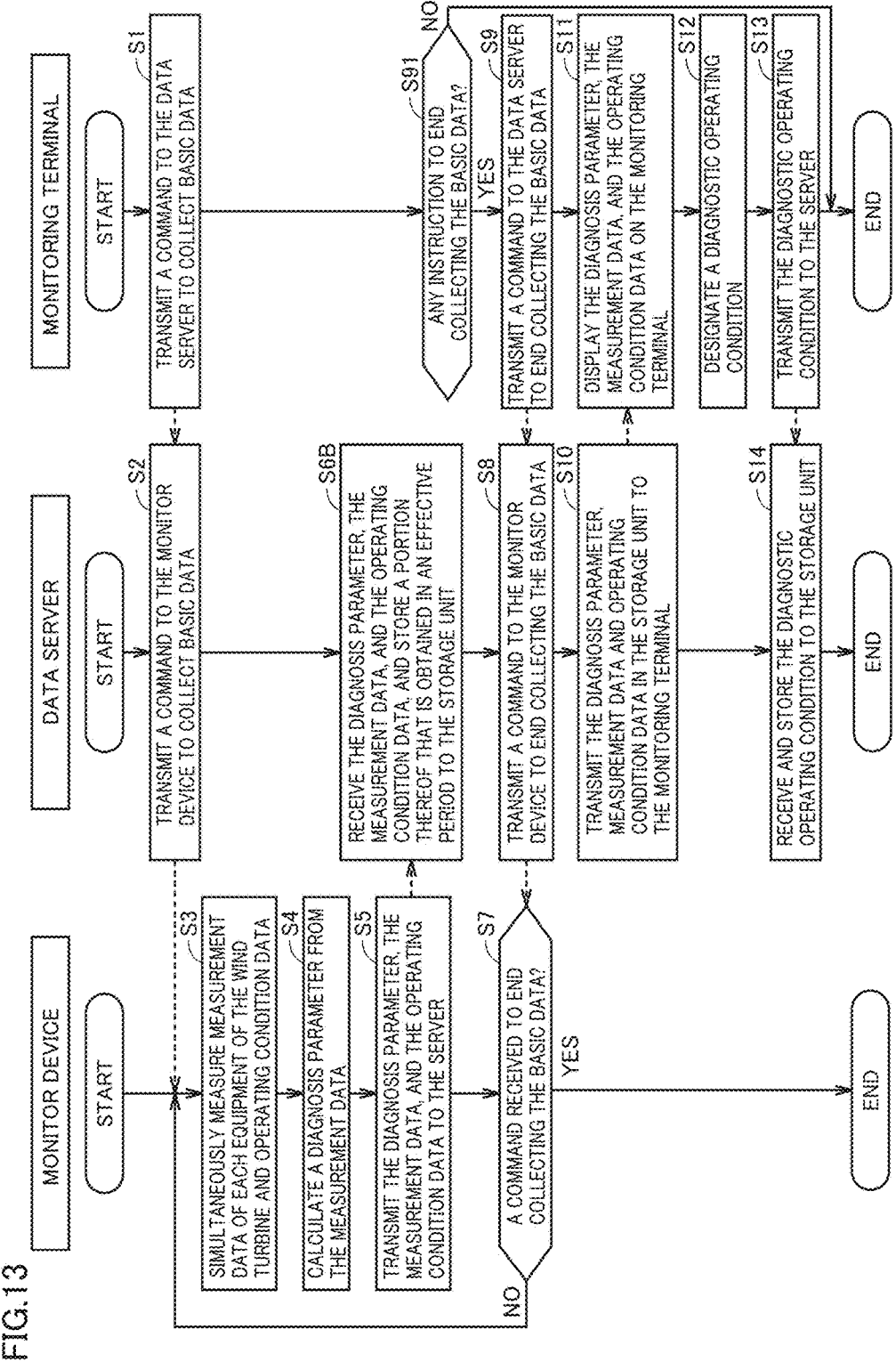
FIG. 13 is a flowchart of an operation of the condition monitoring system in the second embodiment during a basic data collecting period.

FIG. 13 is a flowchart for describing a process in the basic data collecting period in the condition monitoring system according to the second embodiment, as compared with the first embodiment shown in FIG. 5. FIG. 13 is different from FIG. 5 in that step S6 is substituted with step S6B.

In step S6B, data server 330 receives a diagnosis parameter, measurement data, and operating condition data, and stores a portion thereof that is obtained in an effective period to the storage unit. Herein, the effective period is a period in which rotation angle sensor 70I senses that nacelle 90 has rotating angular velocity $\omega$ (rad/s) of 0 (i.e., nacelle 90 does not rotate).

Figure 14:
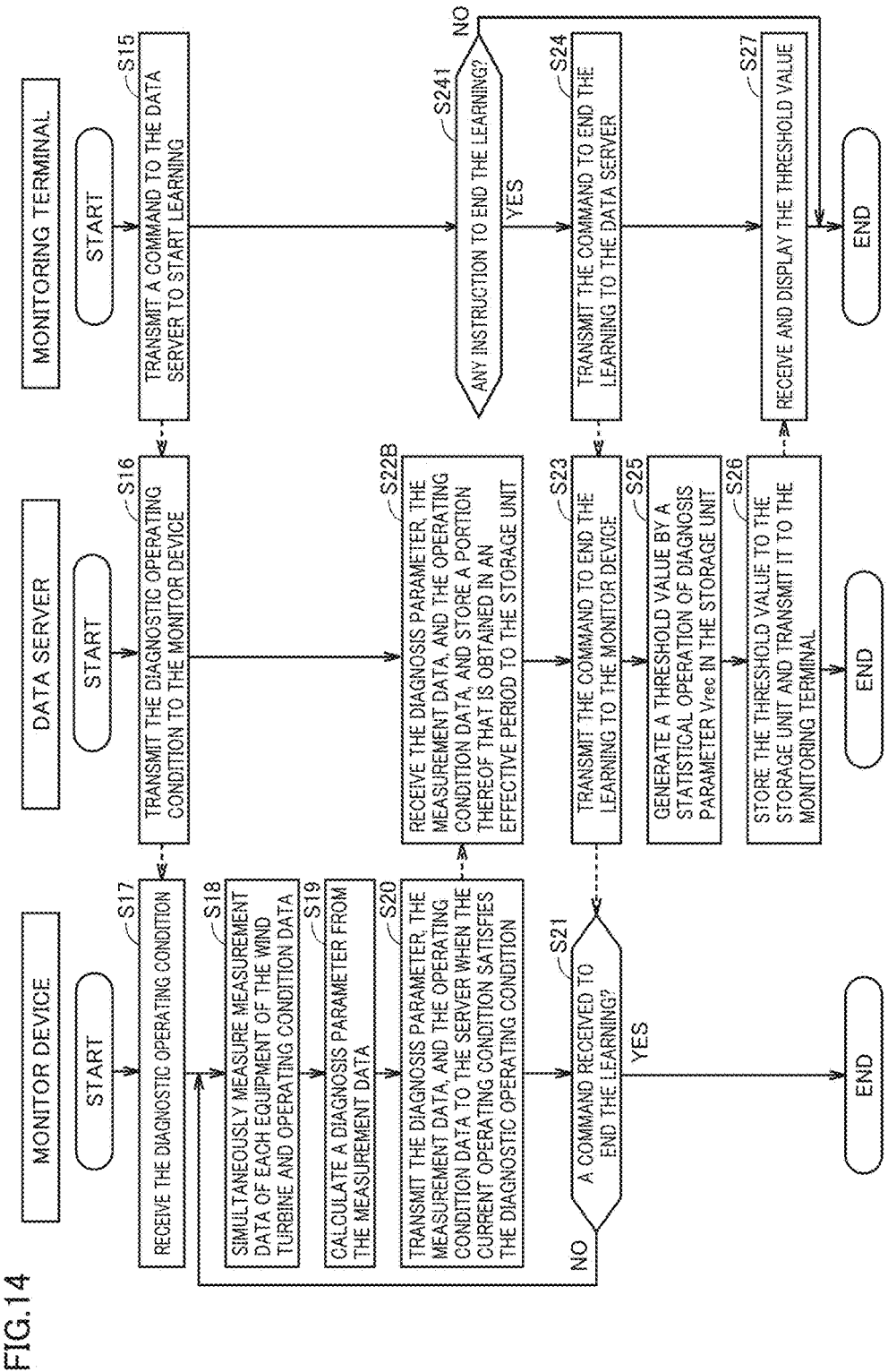
FIG. 14 is a flowchart of an operation of the condition monitoring system in the second embodiment during a learning period.

FIG. 14 is a flowchart for describing a process in the learning period of wind turbine 10 in the condition monitoring system according to the second embodiment, as compared with the first embodiment shown in FIG. 6. FIG. 14 is different from FIG. 6 in that Step S22 is substituted with step S22B, and furthermore, step S231 is deleted.

In step S22B, data server 330 receives a diagnosis parameter, measurement data, and operating condition data, and stores a portion thereof that is obtained in an effective period (i.e., a period in which nacelle 90 does not rotate) to the storage unit. When a command to end the learning is transmitted from monitoring terminal 340 to data server 330 (step S24), data server 330 transmits the command to monitor device 80 to end the learning (step S23), and simultaneously, by a statistical operation of the diagnosis parameter stored in the storage unit, data server 330 automatically generates a threshold value for the diagnosis parameter for each diagnostic operating condition (step S25).

Figure 15:
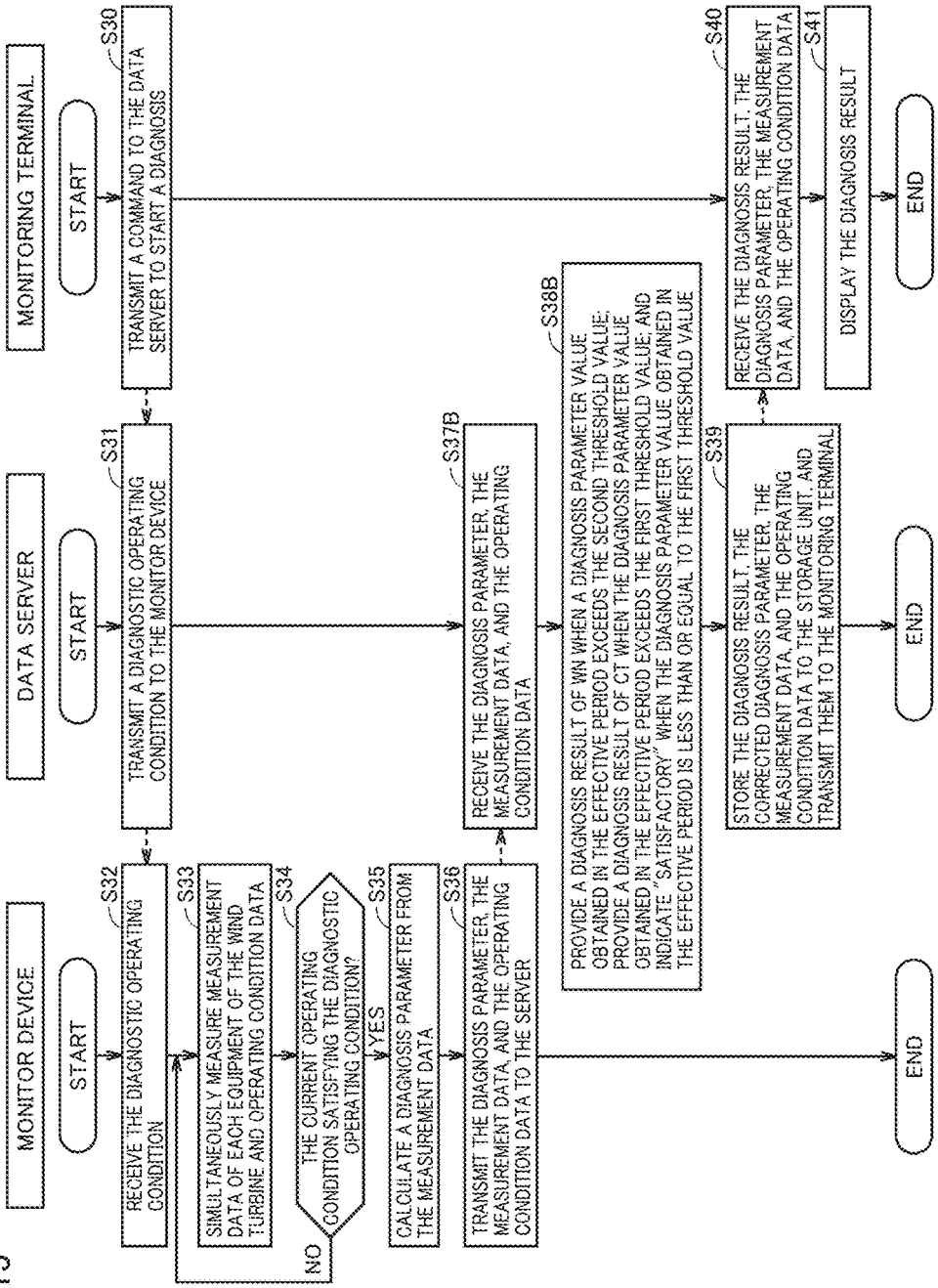
FIG. 15 is a flowchart of an operation of the condition monitoring system in the second embodiment during a service period.

FIG. 15 is a flowchart for describing a process in the service period in the condition monitoring system according to the second embodiment, as compared with the first embodiment shown in FIG. 7. FIG. 15 is different from FIG. 7 in that step S37 and step S38 are substituted with step S37B and step S38B, respectively.

In step S37B, data server 330 receives a diagnosis parameter, measurement data, and operating condition data from the monitor device. And in step S38B, data server 330 then determines the condition of each equipment of wind turbine 10 based on a received diagnosis parameter that is obtained in the effective period and a threshold value generated during the learning period. For example, when a diagnosis parameter value obtained in the effective period exceeds second threshold value WN, data server 330 provides a diagnosis result of WN, whereas when the diagnosis parameter value obtained in the effective period exceeds first threshold value CT, data server 330 provides a diagnosis result of CT. This diagnosis result, the diagnosis parameter value obtained in the effective period, the measurement data, and the operating condition data are stored to the storage unit of data server 330, and these pieces of data are transmitted to monitoring terminal 340 (step S39).

Thus, in the second embodiment, a period in which nacelle 90 does not rotate is set as an effective period of a diagnosis parameter and the diagnosis parameter is recorded only for the effective period, and accordingly, the diagnosis parameter's variation is suppressed to be small. Accordingly, threshold value VTH can be set to a relatively low value, and a failure of a mechanical element can be sensed at an early stage.

Note that while in the above example, a period in which nacelle 90 does not rotate is set as an effective period, for example a period in which average value ωa in absolute value (or magnitude) of rotating angular velocity ω of nacelle 90 within a predetermined time indicated in the first embodiment by expression (1) is smaller than predetermined value ωa0 may be an effective period of a diagnosis parameter.

While in the first and second embodiments, sensor 70I including a gyro sensor senses the rotating angular velocity of nacelle 90 and a diagnosis parameter is corrected based on the sensed result, this is not exclusive, and the rotating angular velocity of nacelle 90 may be sensed by any means.

For example, a direction sensor which measures terrestrial magnetism may be used to measure variation in azimuth with time and an azimuthal angle may be differentiated by time to obtain a rotating angular velocity of nacelle 90.

Furthermore, a GPS (Global Positioning System) sensor which measures a position by utilizing a satellite may be used. Two GPS sensors spaced by a prescribed distance may be provided to nacelle 90 to obtain the azimuth of nacelle 90 from the relative positions of the two GPS sensors, and the azimuth may be differentiated by time to obtain a rotating angular velocity of nacelle 90.

Furthermore, a single GPS sensor may be used to record a locus of nacelle 90 when it rotates once, and the recorded locus and the current positional information may be used to calculate an azimuthal angle of nacelle 90, which may in turn be differentiated by time to obtain a rotating angular velocity.

Furthermore, a video recorder may be used to record a scenery around nacelle 90, and from how the scenery changes, a rotating angular velocity may be obtained.

Furthermore, at least one of a driving current and a driving voltage of drive device 124 for rotating nacelle 90 may be measured and the measured value may be used to calculate a rotation speed of nacelle 90.

Furthermore, a contactless displacement gage may be used to measure rotation of a gear for rotating nacelle 90 and the measured value may be used to calculate a rotating angular velocity of nacelle 90.

Furthermore, information from SCADA (Supervisory Control and Data Acquisition) which separately monitors the wind turbine may be used to obtain a rotating angular velocity of nacelle 90.

Note that in the above embodiments, sensors 70A-70H each correspond to one embodiment of a "first detector" in the present invention, and rotation angle sensor 70I corresponds to one embodiment of a "second detector" in the present invention. Furthermore, data server 330 corresponds to one embodiment of a "controller" in the present invention.

It should be understood that the embodiments disclosed herein have been described for the purpose of illustration only and in a non-restrictive manner in any respect. The scope of the present invention is defined by the terms of the claims, rather than the description above, and is intended to include any modifications within the meaning and scope equivalent to the terms of the claims.

REFERENCE SIGNS LIST

10: wind turbine; 20: main shaft; 30: blade; 40: speed up gear; 50: power generator; 60 main shaft bearing; 70A-70I: sensor; 80: monitor device; 90: nacelle; 100: tower; 122: bearing; 124: drive device; 126: ring gear; 320: internet; 330: data server; 340: monitoring terminal.

The invention claimed is:

1. A condition monitoring system for monitoring a condition of equipment configuring a wind turbine, the wind turbine including a nacelle rotatably supported on
   a top of a tower, the condition monitoring system comprising:
   a first detector configured to detect the condition of the equipment;
   a monitor device configured to generate a diagnosis parameter based on a detection result of the first detector;
   a controller configured to diagnose a failure of the equipment based on the diagnosis parameter; and
   a second detector configured to detect a rotation speed of the nacelle,
   the controller being configured to diagnose whether the equipment has a failure by correcting the diagnosis parameter using a relationship between a dimensionless diagnosis parameter, which is obtained by dividing the diagnosis parameter by a diagnosis parameter obtained during non-rotation of the nacelle, and a dimensionless rotation speed of the nacelle, which is obtained by dividing the rotation speed of the nacelle calculated based on a detection result of the second detector by a maximum speed thereof, and comparing the corrected diagnosis parameter with a predetermined threshold value.

2. The condition monitoring system according to claim 1, wherein:
   the controller is configured to correct the diagnosis parameter by using a correction function with the dimensionless rotation speed of the nacelle used as a variable; and
   the correction function is a function which corrects the diagnosis parameter so that as the nacelle has a higher rotation speed, a ratio of the diagnosis parameter after the correction to the diagnosis parameter before the correction becomes smaller.

3. The condition monitoring system according to claim 2, wherein the controller is configured to calculate an average value of the rotation speed of the nacelle in a predetermined period before the diagnosis, and correct the diagnosis parameter using the correction function based on the average value.

4. The condition monitoring system according to claim 1, wherein:
   the monitor device is configured to transmit the diagnosis parameter and a detection result of the second detector in a first period before the diagnosis to the controller;
   the controller is configured to (i) store data received from the monitor device, (ii) when the first period ends, correct the diagnosis parameter of the first period based on the detection result of the second detector and (iii) generate the threshold value based on the corrected diagnosis parameter;

the monitor device is configured to transmit to the controller the diagnosis parameter obtained in a second period after the first period elapses; and the controller is configured to correct the diagnosis parameter of the second period based on a detection result of the second detector in the second period, and diagnose whether the equipment has a failure by comparing the corrected diagnosis parameter with the threshold value.

5. The condition monitoring system according to claim 1, wherein the controller is configured to correct the diagnosis parameter based on the rotation speed of the nacelle obtained from information from SCADA (Supervisory Control and Data Acquisition) separately monitoring the wind turbine.

6. The condition monitoring system according to claim 1, wherein the second detector includes at least one of a direction sensor, a gyro sensor, and a GPS (Global Positioning System).

7. The condition monitoring system according to claim 1, wherein the second detector includes a detector to detect at least one of a driving current and a driving voltage of a drive device driving the nacelle.

8. A wind power generation system comprising:

the wind turbine; and the condition monitoring system according to claim 1.

* * * * *